United States Patent
Coker

(10) Patent No.: US 7,962,565 B2
(45) Date of Patent: Jun. 14, 2011

(54) METHOD, APPARATUS AND SYSTEM FOR A MOBILE WEB CLIENT

(75) Inventor: John Coker, Hillsborough, CA (US)

(73) Assignee: Siebel Systems, Inc., San Mateo, CA (US)

(*) Notice: Subject to any disclaimer, the term of this patent is extended or adjusted under 35 U.S.C. 154(b) by 1124 days.

(21) Appl. No.: 10/254,384

(22) Filed: Sep. 24, 2002

(65) Prior Publication Data

US 2003/0074418 A1 Apr. 17, 2003

Related U.S. Application Data

(60) Provisional application No. 60/326,741, filed on Sep. 29, 2001.

(51) Int. Cl.
*G06F 15/16* (2006.01)

(52) U.S. Cl. .......... 709/217; 709/224; 709/228; 707/10

(58) Field of Classification Search .............. 709/203, 709/224, 228, 213, 218, 227, 220, 225, 229, 709/217; 703/27, 23; 370/466; 707/10; 717/174

See application file for complete search history.

(56) References Cited

U.S. PATENT DOCUMENTS

| | | | | |
|---|---|---|---|---|
| 5,568,612 A * | 10/1996 | Barrett et al. | | 709/203 |
| 5,572,643 A * | 11/1996 | Judson | | 709/218 |
| 5,619,650 A * | 4/1997 | Bach et al. | | 709/246 |
| 5,715,450 A | 2/1998 | Ambrose et al. | | |
| 5,873,096 A | 2/1999 | Lim et al. | | |
| 5,878,218 A * | 3/1999 | Maddalozzo et al. | | 709/213 |
| 5,963,953 A | 10/1999 | Cram et al. | | |
| 5,978,813 A * | 11/1999 | Foltz et al. | | 707/201 |
| 5,991,760 A | 11/1999 | Gauvin et al. | | |
| 6,016,318 A | 1/2000 | Tomoike | | |
| 6,035,324 A | 3/2000 | Chang et al. | | 709/203 |
| 6,092,083 A | 7/2000 | Brodersen et al. | | |
| 6,096,096 A | 8/2000 | Murphy et al. | | |
| 6,233,541 B1 | 5/2001 | Butts et al. | | |
| 6,233,542 B1 * | 5/2001 | Butts et al. | | 703/27 |
| 6,374,207 B1 | 4/2002 | Li et al. | | |
| 6,836,799 B1 * | 12/2004 | Philyaw et al. | | 709/224 |
| 7,152,220 B2 * | 12/2006 | Rickards et al. | | 717/101 |
| 7,330,830 B1 * | 2/2008 | Lamoureux et al. | | 705/34 |
| 2002/0107994 A1 * | 8/2002 | Rickards et al. | | 709/313 |
| 2002/0178232 A1 * | 11/2002 | Ferguson | | 709/217 |
| 2003/0055954 A1 * | 3/2003 | Kavanagh | | 709/224 |

FOREIGN PATENT DOCUMENTS

JP 2009185659 A 8/2009
WO PCTUS02/030885 9/2002

OTHER PUBLICATIONS

Butrico, Maria A., et al., "Gold Rush: mobile transaction middleware with Java-object replication," Conference on Object-Oriented Technologies, Jun. 16, 1997, pp. 91-101.

(Continued)

*Primary Examiner* — Khanh Q Dinh

(74) *Attorney, Agent, or Firm* — Campbell Stephenson LLP

(57) ABSTRACT

A method, system and apparatus for a mobile web client is presented. In one embodiment, the invention is a method of operating a web application. The method includes receiving a request from a client. The method further includes processing the request with a web emulator. The method also includes servicing the request from available data.

17 Claims, 27 Drawing Sheets

OTHER PUBLICATIONS

Hild, Stefan G., et al., "Mobilizing Applications" IEEE Personal Communications, IEEE Communications Society, vol. 4, No. 5, Oct. 1997, p. 27.

Schilit Bill N., et al., "TeleWeb: Loosely connected access to the World Wide Web," Computer Networks and ISDN Systems, North Holland Publishing, vol. 28, No. 11, May 1996, pp. 1431-1444.

* cited by examiner

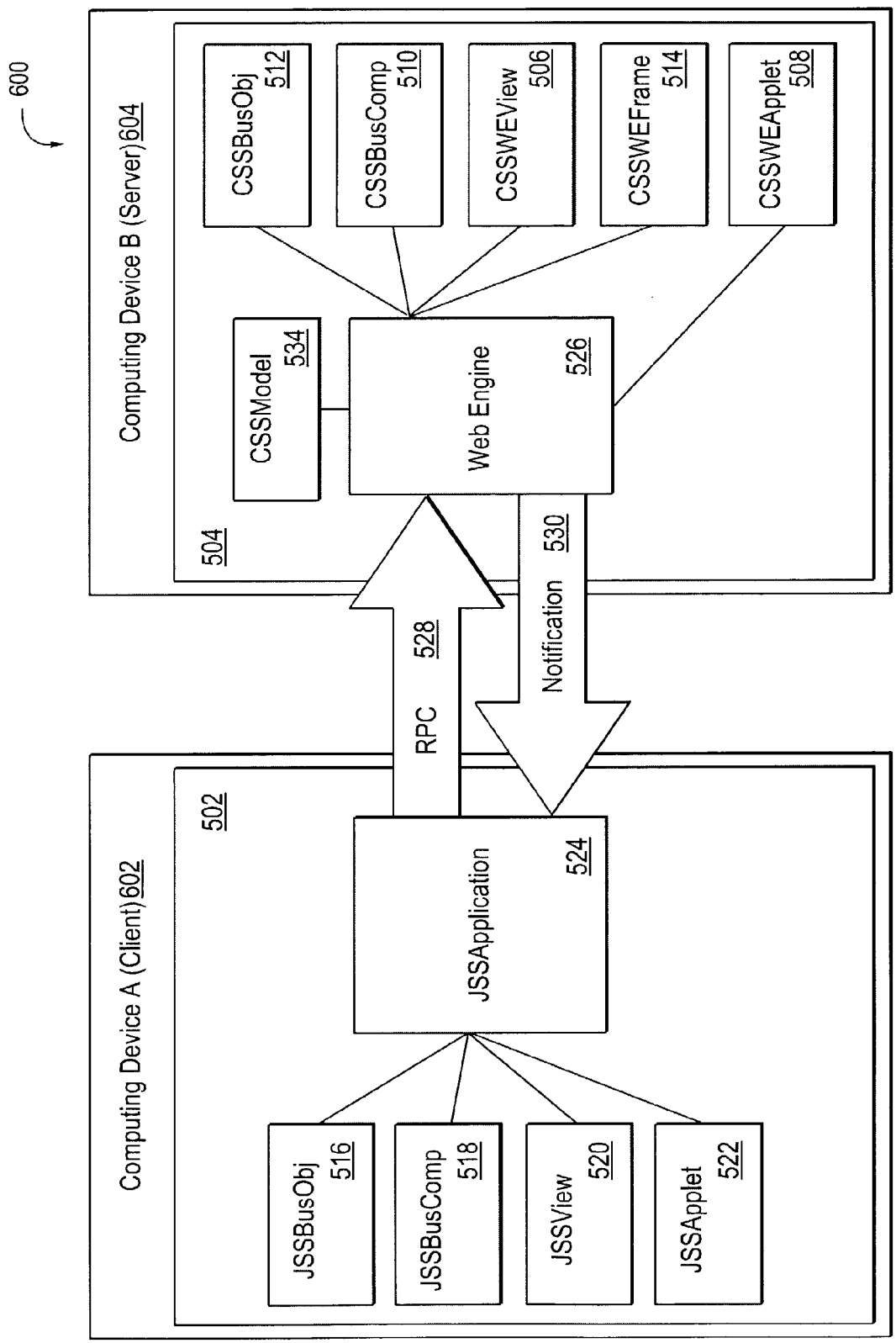

METHOD, APPARATUS AND SYSTEM FOR A MOBILE WEB CLIENT

CLAIM OF DOMESTIC PRIORITY

This application claims priority to a previously filed provisional application having serial No. 60/326,741, entitled "METHOD, APPARATUS AND SYSTEM FOR A MOBILE WEB CLIENT" and filed on Sep. 29, 2001.

BACKGROUND OF THE INVENTION

1. Field of the Invention

The present invention relates generally to the field of data processing. More specifically, the present invention relates to a method, apparatus, and system for a mobile web client.

2. Description of the Related Art

As technology continues to advance and the business environments have become increasingly complex and diverse, more and more companies have relied on various customer relationship management (CRM) software and eBusiness applications to conduct and manage various aspects of their enterprise business. In general, eBusiness applications are designed to enable a company or enterprise to conduct its business over an interactive network (e.g., Internet, Intranet, Extranet, etc.) with its customers, partners, suppliers, distributors, employees, etc. eBusiness applications may include core business processes, supply chain, back-office operations, and CRM functions. CRM generally includes various aspects of interaction a company has with its customers, relating to sales and/or services. At a high level, customer relationship management is focused on understanding the customer's needs and leveraging this knowledge to increase sales and improve service. CRM application and software is generally designed to provide effective and efficient interactions between sales and service, and unify a company's activities around the customer in order to increase customer share and customer retention through customer satisfaction.

Typically, CRM implementation strategy needs to consider the following:

Knowledge Management: one of the important factors of an effective CRM implementation is the acquisition of information about a customer, its analysis, sharing and tracking. Also integral to the use of knowledge for competitive advantage is for employees to know what actions to take as a result of this knowledge.

Database Consolidation: another important aspect of an effective and efficient CRM solution is the consolidation of customer information in a single database and the re-engineering of business processes around the customer. The goal here is to have all interactions with a customer recorded in one place to drive production, marketing, sales and customer support activities.

Integration of Channels and Systems: it is very important for a CRM application/software to provide the capability to respond to customers in a consistent and high-quality manner through their channel of choice, whether that is the e-mail, the phone, web-based user interfaces, etc. This may require the seamless integration of various communication channels with the customer or enterprise database. It also may require the integration of CRM with other parts of a company's business systems and applications.

Technology and Infrastructure: to enhance customer services, a CRM application/software may include various tools to automate and streamline online customer service. For example, a self-help model typically can be implemented using a combination of tools (e.g. knowledge bases with an intuitive search capability, agent technology or automated email, etc.).

Generally, eBusiness applications are designed to allow organizations to create a single source of customer information that makes it easier to sell to, market to, and service customers across multiple channels, including the Web, call centers, field, resellers, retail, and dealer networks. Advanced eBusiness applications are typically built on a component-based architecture and are designed to be Web-based and to deliver support for various types of clients on multiple computing platforms including mobile clients, connected clients, thin clients, and handheld clients, etc.

With the recent proliferation of the Web, it is desirable to provide the functionalities of the eBusiness applications in a Web-based environment. Furthermore, it is desirable for the eBusiness applications operating in a Web-based environment to retain the look-and-feel of desktop-based eBusiness applications with which the users are already familiar.

With the advent of web applications, dependency on availability of a network such as an internet or the world wide web for operation of such applications also arrived. However, it will be appreciated that a robust solution for working both in a networked environment or situation and a corresponding non-networked environment or situation may be useful to mobile users of a web application. Such a web application is not immediately available.

BRIEF DESCRIPTION OF THE DRAWINGS

The present invention is illustrated by way of example and not limitation in the accompanying figures.

FIG. 6A illustrates an exemplary configuration in which objects on the browser and objects managed by the object manager (OM) reside and operate on multiple computing devices, including a client and a server.

DETAILED DESCRIPTION

A method, apparatus and system for a mobile web client is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments.

System Overview and Overall Architecture

Figure 1:
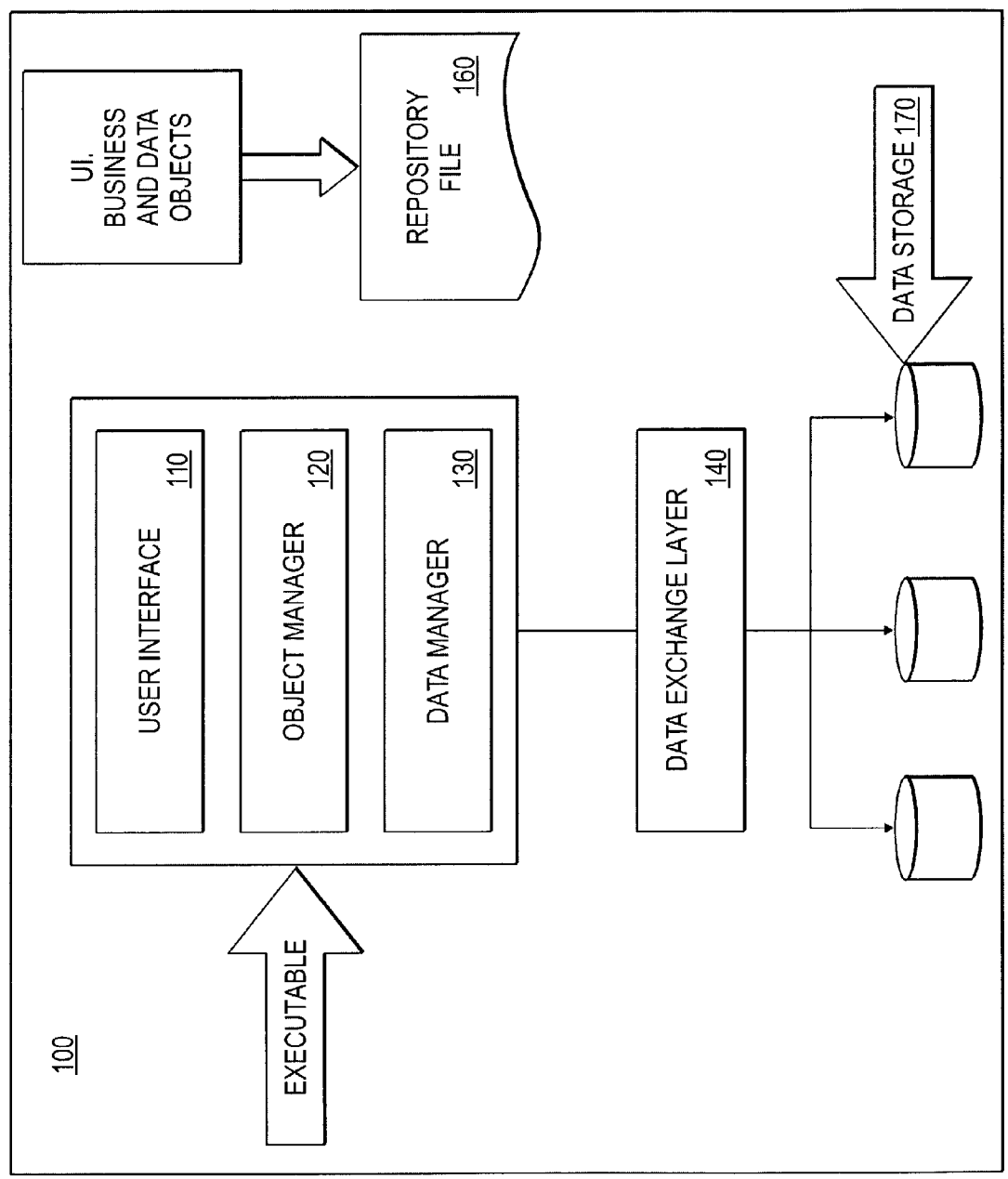
FIG. 1 shows a multi-layered system architecture in which the teachings of the present invention are implemented.

In one embodiment, a system in which the teachings of the present invention are implemented can be logically structured as a multi-layered architecture as shown in FIG. 1. In one embodiment, the logical multi-layered architecture as shown in FIG. 1 provides a platform for common services to support the various applications. These services may include a user interface layer 110, an object manager layer 120, a data manager layer 130, and a data exchange layer 140.

In one embodiment, the user Interface layer 110 may provide the applets, views, charts and reports, etc. associated with one or more applications. In one embodiment, various types of clients can be supported via the user interface layer 110. These various types of clients may include traditional connected clients, remote clients, thin clients over an intranet, Java thin clients or non-Windows-based operating systems, and HTML clients over the Internet, etc.

In one embodiment, the object manager layer 120 is designed to manage one or more sets of business rules or business concepts associated with one or more applications and to provide the interface between the user interface layer 110 and the data manager layer 130. In one embodiment, the business rules or concepts can be represented as business objects. In one embodiment, the business objects may be designed as configurable software representations of the various business rules or concepts such as accounts, contacts, opportunities, service requests, solutions, etc.

In one embodiment, the data manager layer 130 is designed to maintain logical views of the underlying data and to allow the object manager to function independently of underlying data structures or tables in which data are stored. In one embodiment, the data manager 130 may also provide certain database query functions such as generation of structure query language (SQL) in real time to access the data. In one embodiment, the data manager 130 is designed to operate on object definitions in a repository file 160 that define the database schema. In one embodiment, the data storage services 170 provide the data storage for the data model associated with one or more applications.

In one embodiment, the data exchange layer is designed to handle the interactions with one or more specific target databases and provide the interface between the data manager layer 130 and the underlying data sources.

Figure 2:
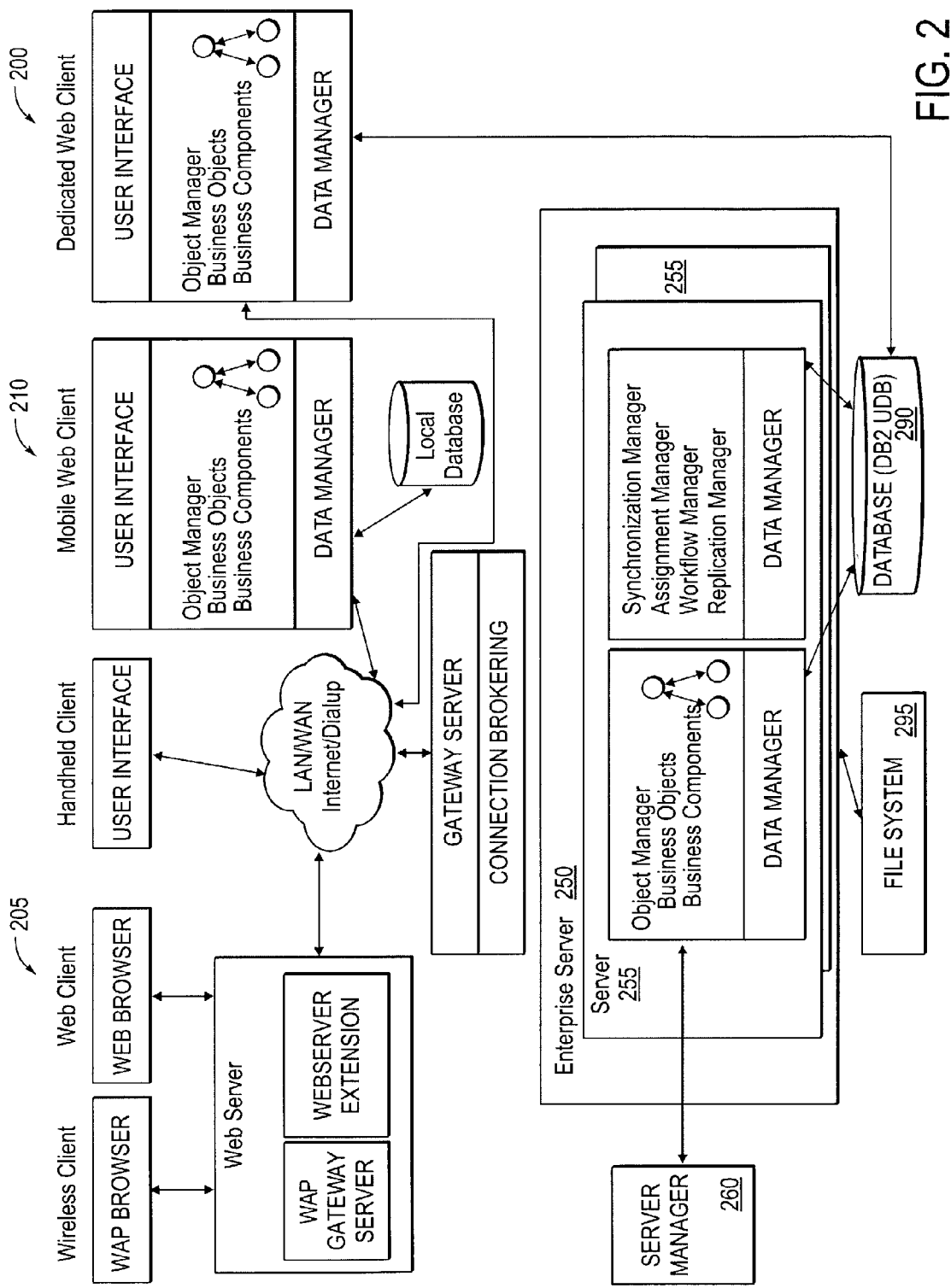
FIG. 2 shows a block diagram of one embodiment of a system configuration in which the teachings of the present invention are implemented.

FIG. 2 shows a block diagram of one embodiment of a system configuration in which the teachings of the present invention are implemented.

In one embodiment, the multi-layered architecture allows one or more software layers to reside on different machines. For example, in one embodiment, the user interface, the object manager, and the data manager can all reside on the dedicated web clients. For other types of clients such as the wireless clients, in one embodiment, the object manager and data manager can reside on a system server. It should be appreciated and understood by one skilled in the art that the system configuration shown in FIG. 2 is for illustrative and explanative purposes and may vary depending upon the particular implementations and applications of the teachings of the present invention.

In one embodiment, the system environment illustrated in FIG. 2 may include more than one database 290. One or more subsets of the database 290 can be created or replicated by a replication manager. In addition, mobile web clients can have additional remote databases (also called local databases). In one embodiment, unless the remote or local databases associated with the mobile web clients are defined as read-only databases, these mobile web clients can create and update data locally that will be ultimately propagated up to the primary database when each mobile web client synchronizes with the system server.

In one embodiment, the database 290 is designed to store various types of data including predefined data schema (e.g., table objects, index objects, etc.), repository objects (e.g., business objects and components, view definitions and visibility rules, etc.), and user's or customer's data. In one embodiment, dedicated web clients and server components, including those that operate in conjunction with the other types of clients, can connect directly to the database 290 and make changes in real time. In one embodiment, mobile web clients can download a subset of the server's data to use locally, and periodically synchronize with the server database through the system server to update both the local and the server database.

In one embodiment, various tables included in the database 290 may be logically organized into the following types: data tables, interface tables, and repository tables, etc.

In one embodiment, data tables may be used to store user business data, administrative data, seed data, and transaction data, etc. In one embodiment, these data tables may be populated and updated through the various applications and processes. In one embodiment, data tables may include the base tables and the intersection tables, etc. In one embodiment, base tables may contain columns that are defined and used by the various applications. In one embodiment, the base tables are designed to provide the columns for a business component specified in the table property of that business component. In one embodiment, intersection tables are tables that are used to implement a many-to-many relationship between two business components. They may also hold intersection data columns, which store information pertaining to each association. In one embodiment, intersection tables provide the data structures for association applets.

In one embodiment, interface tables are used to denormalize a group of base tables into a single table that external programs can interface to. In one embodiment, they may be used as a staging area for exporting and importing of data.

In one embodiment, repository tables contain the object definitions that specify one or more applications regarding:

The client application configuration

The mapping used for importing and exporting data

Rules for transferring data to mobile clients

In one embodiment, the file system 295 is a network-accessible directory that can be located on an application server. In one embodiment, the file system 295 stores the physical files created by various applications, such as files created by third-party text editors, and other data that is not stored in the database 290. In one embodiment, physical files stored in the file system 295 can be compressed and stored under various naming conventions. In one embodiment, dedicated web clients can read and write files directly to and from the file system 295. In one embodiment, mobile web clients can have a local file system, which they synchronize with the server-based file system 290 periodically. In one embodiment, other types of client such as the wireless clients and the web clients can access the file system 290 via the system server.

In one embodiment, the enterprise server 250 is a logical grouping of the system servers 255 that share a common table owner or a database, point to a common gateway Server, and can be administered as a group using server manager 260. In one embodiment, the connection to the gateway server can be established via TCP/IP. In one embodiment, the enterprise server 250 can be scaled effectively by deploying multiple system servers 255 in the enterprise server 250, thus providing a high degree of scalability in the middle tier of applications.

In one embodiment, the server 255 runs one or multiple server programs. It handles the incoming processing requests and monitors the state of all processes on the server. In one embodiment, server programs are designed and configured to perform one or more specific functions or jobs including importing and exporting data, configuring the database, executing workflow and process automation, processing to support mobile web clients for data synchronization and replication, and enforcing business rules, etc. In one embodiment, the server 255 can be an NT Service (under Windows NT operating system) or a daemon (e.g., a background shell process) under UNIX operating system. In one embodiment, the server 255 supports both multi-process and multi-threaded components and can operate components in batch, service, and interactive modes.

In one embodiment, the server manager 260 is configured as a utility that allows common control, administration and monitoring across disparate programs for the servers 255 and the enterprise server 250. In one embodiment, the server manager 260 can be used to perform the following tasks: start, stop, pause, and resume servers 255, components, and tasks; monitor status and collect statistics for multiple tasks, components, and servers within an enterprise server; and configure the enterprise server, individual servers individual components, and tasks, etc.

In one embodiment, the gateway server can be configured as a logical entity that serves as a single entry point for accessing servers. In one embodiment, it can be used to provide enhanced scalability, load balancing and high availability across the enterprise server. In one embodiment, the gateway server may include a name server and a connection brokering component. In one embodiment, the name server is configured to keep track of the parameters associated with the servers. For example, the availability and connectivity information associated with the servers can be stored in the name server. The various components in the system can query the name server for various information regarding the servers' availability and connectivity. In a Windows NT environment, the name server can be run as a NT service. In a UNIX environment, the name server can run as a daemon process. In one embodiment, the connection brokering component is used to perform load balancing function such as directing client connection requests to an appropriate server (e.g., the least-busy server).

In one embodiment, as illustrated in FIG. 2, the various types of clients that can be supported by the system may include the following clients: dedicated web clients, mobile web clients, web clients, wireless clients, and handheld clients, etc.

In one embodiment, dedicated web clients (also called connected clients) are connected directly to a database server for data access via a LAN or WAN connection. In one embodiment, these connected or dedicated web clients do not store data locally. These dedicated web clients can also access the file system directly. In one embodiment, the user interface, the object manager, and the data manager layers of the multi-layered architecture reside on the dedicated web client.

In one embodiment, the mobile web clients are designed and configured for local data access and thus can have their own local database and/or local file system. In one embodiment, mobile web clients can interact with other components within the system via the gateway server. Through synchronization, the modifications from the local database and the server database can be exchanged. Mobile web clients are described in more detail below.

In one embodiment, a web client runs in a standard browser format from the client's machine. In one embodiment, the web client can connect to a system server 255 through a web server. In one embodiment, the system server 255 is designed and configured to execute business logic and access data from the database 290 and file system 295. In one embodiment, the web client described herein is designed and configured in accordance with the teachings of the present invention to operate in an interactive mode. In one embodiment, the interactive web client framework as described herein utilizes dynamically created objects implemented in JavaScript on the browser side that correspond to objects on the server side. In one embodiment, these dynamically created objects on the browser side may include the current view and its corresponding applets, the current business object and the corresponding business components, etc. The web client is described in more details below.

In one embodiment, wireless clients are essentially thin clients enabled on wireless devices. The wireless clients can use a wireless application protocol (WAP)-based user interface to communicate and exchange information/data with the system server.

The system configuration illustrated in FIG. 2 is described in more details below with references to various structures, databases, tables, file systems, etc. as illustrating examples.

Figure 3:
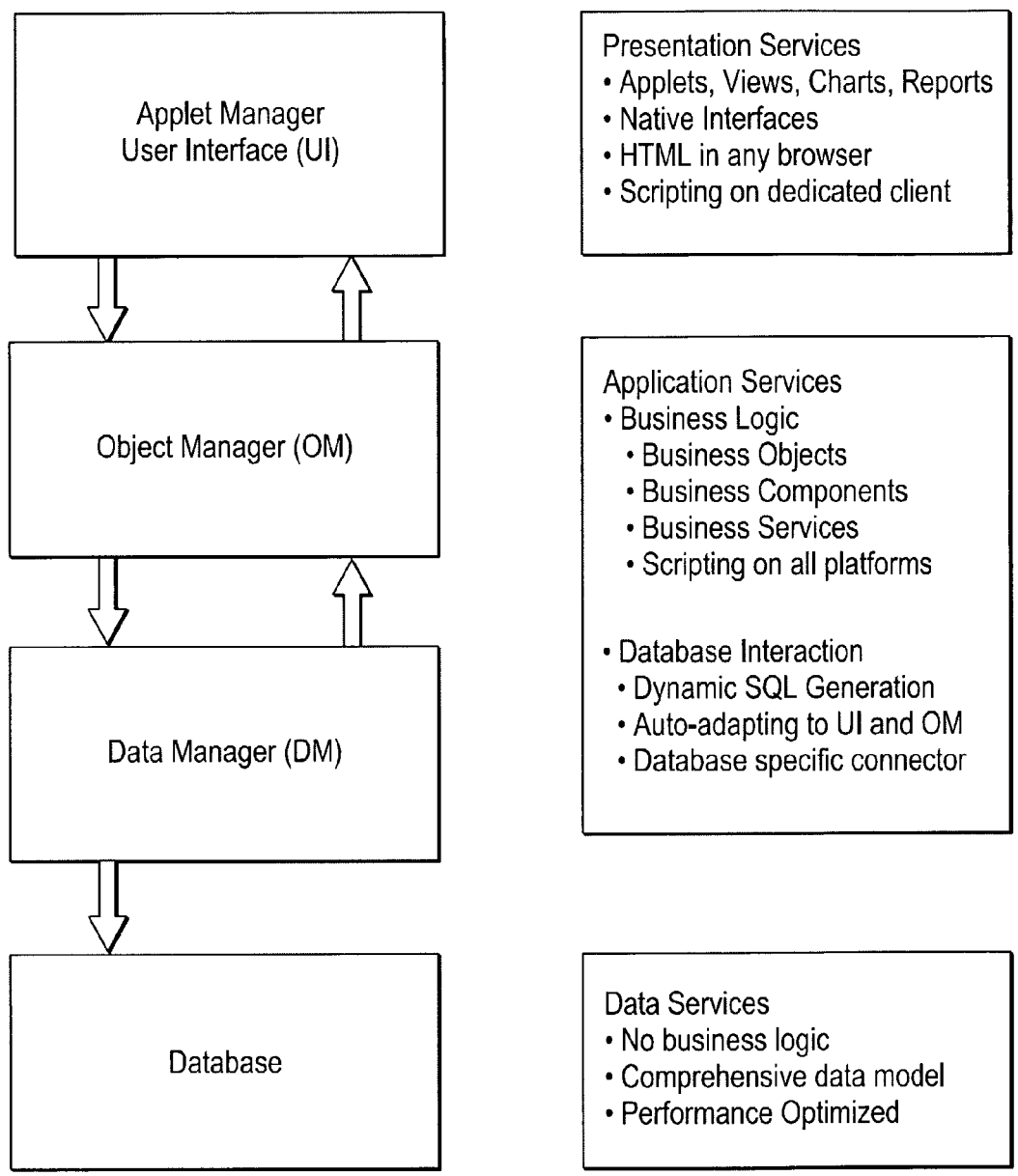
FIG. 3 shows a block diagram illustrating another logical representation of a multi-layered architecture in which applications can be built in accordance with the teachings of the present invention.

FIG. 3 shows a block diagram illustrating another logical representation of a multi-layered architecture in which applications can be built in accordance with the teachings of the present invention. Again, the multi-layered architecture as illustrated in FIG. 3 provides the platform for various common services designed and configured to support the various applications. In one embodiment, these various services may include presentation services logic layer 315 which corresponds to an applet manager and user interface layer 310, application services logical layer 325 which corresponds to an object manager (OM)layer 320 and a data manager (DM) layer 330, and data services logical layer 345 which corresponds to a database layer 340.

In one embodiment, the presentation services 315 may be designed and configured to support various types of clients and may provide them with user interface applets, views, charts, and reports, etc. As described above, a large variety of clients may be supported including wireless clients, handheld clients, web clients, mobile web clients, and dedicated (connected) clients, etc.

In one embodiment, the application services 325 may include business logic services and database interaction services. In one embodiment, business logic services provide the class and behaviors of business objects and business components. In one embodiment, database interaction services may be designed and configured to take the user interface (UI) request for data from a business component and generate the database commands (e.g.SQL queries, etc.) necessary to satisfy the request. For example, the data interaction services may be used to translate a call for data into DBMS-specific SQL statements.

In one embodiment, data storage services 345 may be designed and configured to provide the data storage for the underlying data model which serves as the basis of the various applications. For example, the data model may be designed and configured to support various software products and applications including call center, sales, services, and marketing, etc., as well as various industry vertical products and applications such as eFinance, eInsurance, eCommunications, and eHealthcare, etc.

Figure 4:
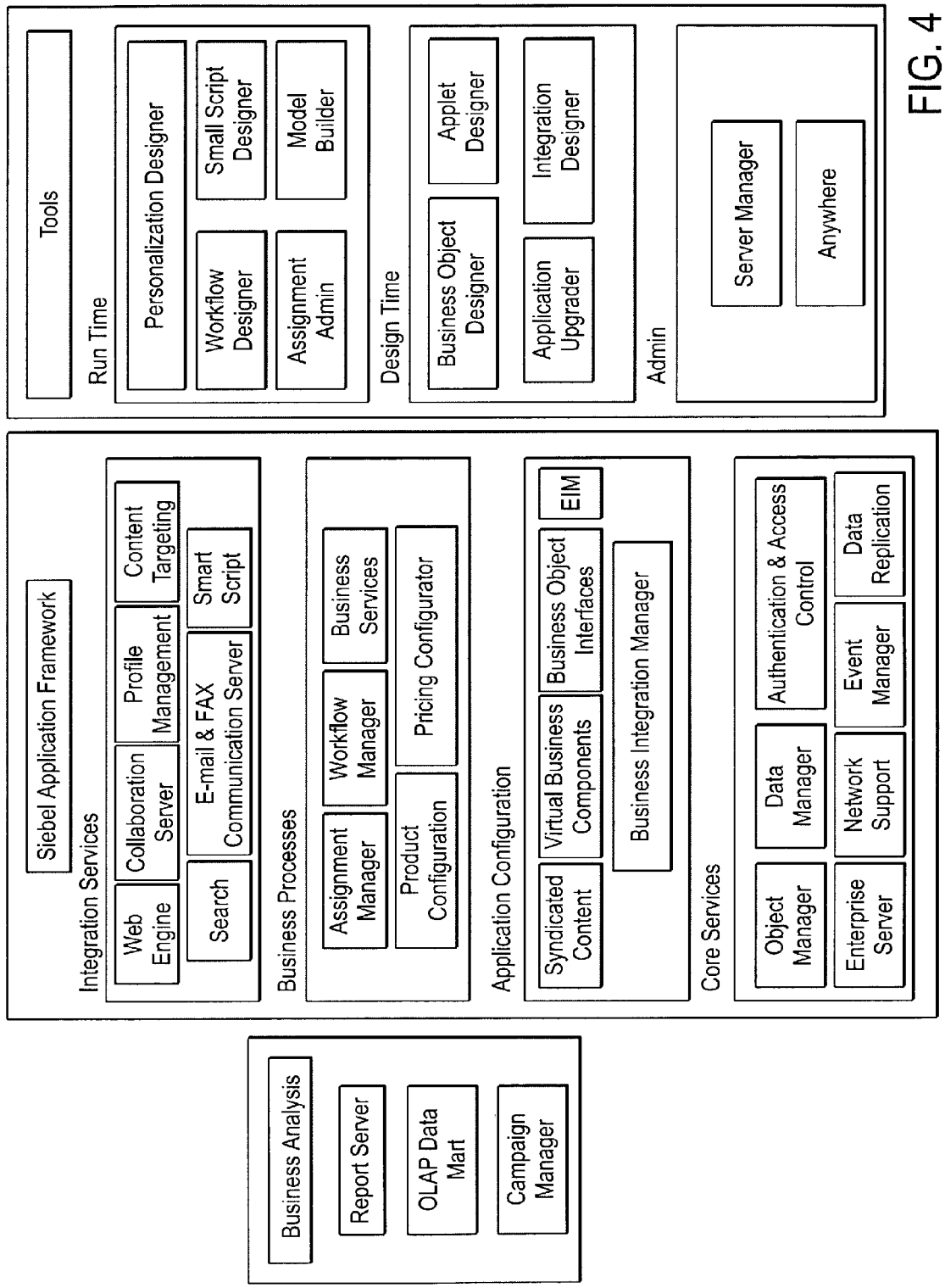
FIG. 4 illustrates a block diagram of one embodiment of an application framework in which the teachings of the present invention may be implemented.

FIG. 4 illustrates a block diagram of one embodiment of an application framework in which the teachings of the present invention may be implemented. As illustrated in FIG. 4, the application framework may include various logical groupings of various types of services and various types of tools that can be used to design and configure particular applications based on business needs and environments.

In one embodiment, the core services are designed and configured to provide the framework in which the applications execute. In one embodiment, the core services may include the following:

The enterprise server, which is the middle-tier application server

The networks that link all of these pieces together

Facilities like event manager and data replication, which allow sharing data between multiple installations of various applications as well as between the various applications and other external applications The authentication and access control, the security facilities.

In one embodiment, application integration services may be designed and configured to allow the various applications built in accordance with this framework to communicate with the external world. In one embodiment, the various types of services in this logical grouping may be designed and configured to provide for real-time, near-real-time, and batch integration with external applications. For example, these integration services may be used to enable communications between external applications and the internal applications using available methods, technologies, and software products. In one embodiment, application integration services allow the systems or applications to share and replicate data with other external enterprise applications. Accordingly, these services allow a particular application or system to be both a client requesting information, and a server having information requested from it.

In one embodiment, business processes services are designed and configured to allow the client to automate business processes through the application. In one embodiment, these various business process services may include the following:

Assignment of tasks through Assignment Manager

Enforcement of business practices through Workflow Manager

Reuse of custom business logic through Business Services

Ensuring proper product configuration and pricing through the Product Configurator and Pricing Configurator In one embodiment, creation of these business processes can be done through Run-Time tools such as Personalization Designer, Workflow Designer, SmartScript Designer, Assignment Administration Views, and the Model Builder, etc.

In one embodiment, integration services may be designed and configured to provide the client with user interface and thin client support. In one embodiment, these may include capabilities for building and maintaining web-based applications, providing web support facilities such as user Profile Management, Collaboration Services and Email and Fax services, as well as advanced Smart Scripting, etc.

In one embodiment, design time tools may be designed and configured to provide the services to customize, design, provide integration points, and maintain the application. These various tools provide one common place to define the application.

In one embodiment, admin services are designed and configured provide one place to monitor and administer the application environment. In one embodiment, these services allow the user to administer the application either through a graphic user interface (GUI) or from a command line, etc.

System Framework or Infrastructure

Figure 5A:
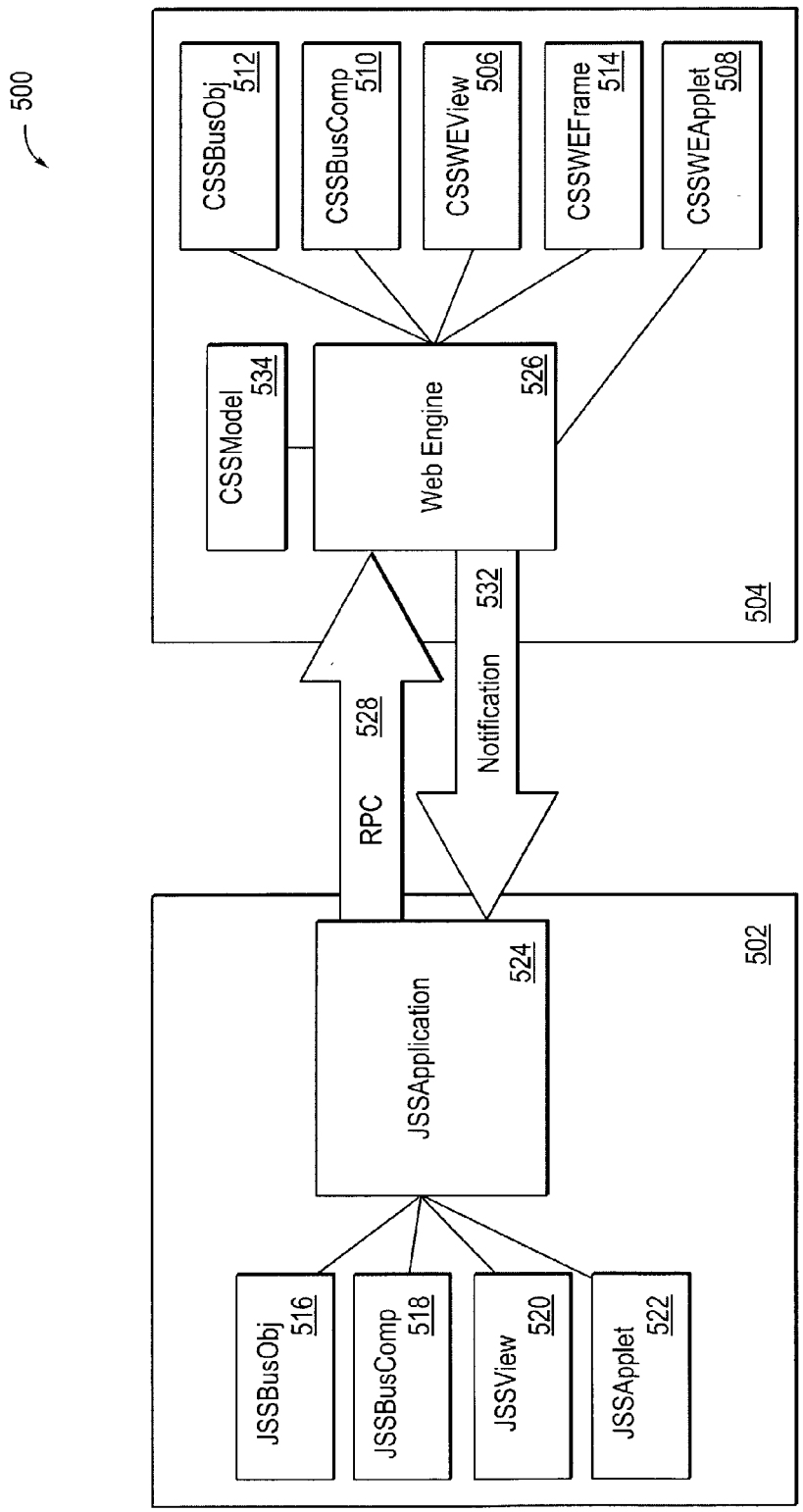
FIG. 5A illustrates an exemplary framework or infrastructure 500 to support an interactive web client and an mobile web client of FIG. 2.
Figure 5B:
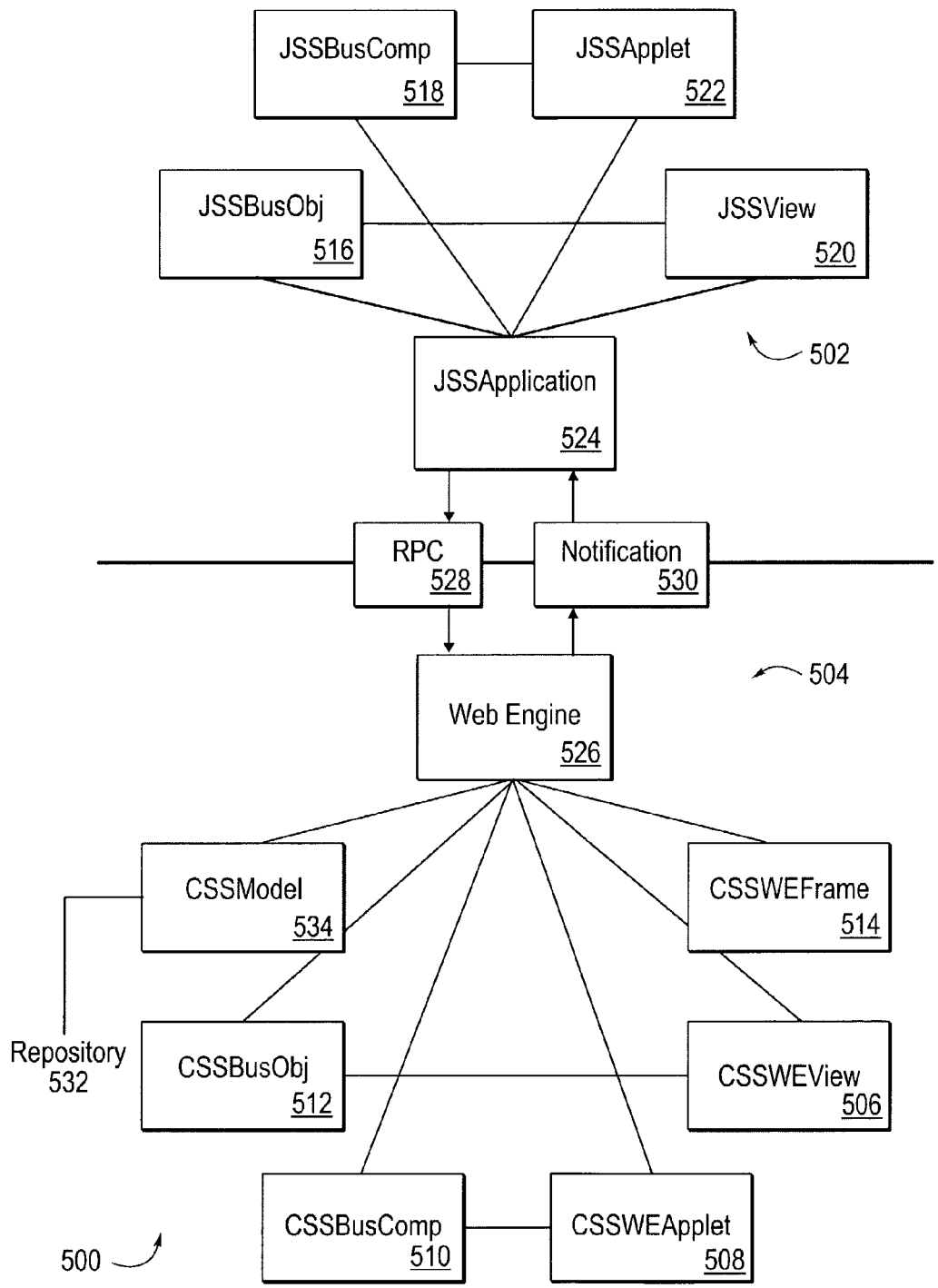
FIG. 5B illustrates an alternative view of the exemplary framework or infrastructure shown in FIG. 5A.

FIG. 5A illustrates an exemplary system framework or infrastructure 500 to support an interactive web client 205 and a mobile web client 210 of FIG. 2 in accordance with one embodiment of the present invention. FIG. 5B illustrates an alternative view of the exemplary system framework or infrastructure 500 shown in FIG. 5A.

The framework or infrastructure 500 can support the interactive web client 205 (shown in FIG. 2) and the mobile web client 210 (also shown in FIG. 2), and is capable of meeting certain criteria, such as increasing the interactivity and performance of the web client and the mobile web client, and reducing the number of page refreshes for common actions.

The framework or infrastructure 500 can include objects 502 that can be dynamically created on the browser to mimic corresponding objects 504 managed by the object-manager. In one embodiment, the objects 504 managed by the object manager (OM) can be built using a programming language, such as C+++, supporting the object-oriented paradigm.

As shown in FIGS. 5A and 5B, exemplary objects 504 managed by the OM can include an object 506 representing a view, CSSWEView 506. A view is generally a display panel consisting of a particular arrangement of applets. In one embodiment, one active view can be displayed at any given time. Another exemplary object managed by the OM can be an object 508 representing an applet, CSSWEApplet 508. An applet is generally a visual application unit that appears on the screen as part of a view. Other exemplary objects managed by the OM can include an object 510 representing a business component (CSSBusComp 510), an object 512 representing a business object (CSSBusObj 512), and an object 514 representing a frame (CSSWEFrame 514). In one embodiment, the business object may be designed as configurable software representations of the various business rules or concepts such as accounts, contacts, opportunities, service requests, solutions, etc. In this embodiment, the business components typically provide a layer of wrapping over tables, and the applets reference business components rather than the underlying tables. In addition, a frame is generally a sub-component of a view and may comprise of one or more applets.

In one embodiment, objects 502 on the browser can be built using JavaScript. As shown in FIGS. 5A and 5B, exemplary objects 502 on the browser side may include JSSBusObj 516, JSSBusComp 518, JSSView 520, and JSSApplet 522 to respectively mirror CSSBusObj 512, CSSBusComp 510, CSSWEView 506, and CSSWEApplet 508, which are objects 504 managed by the OM.

Figure 6B:
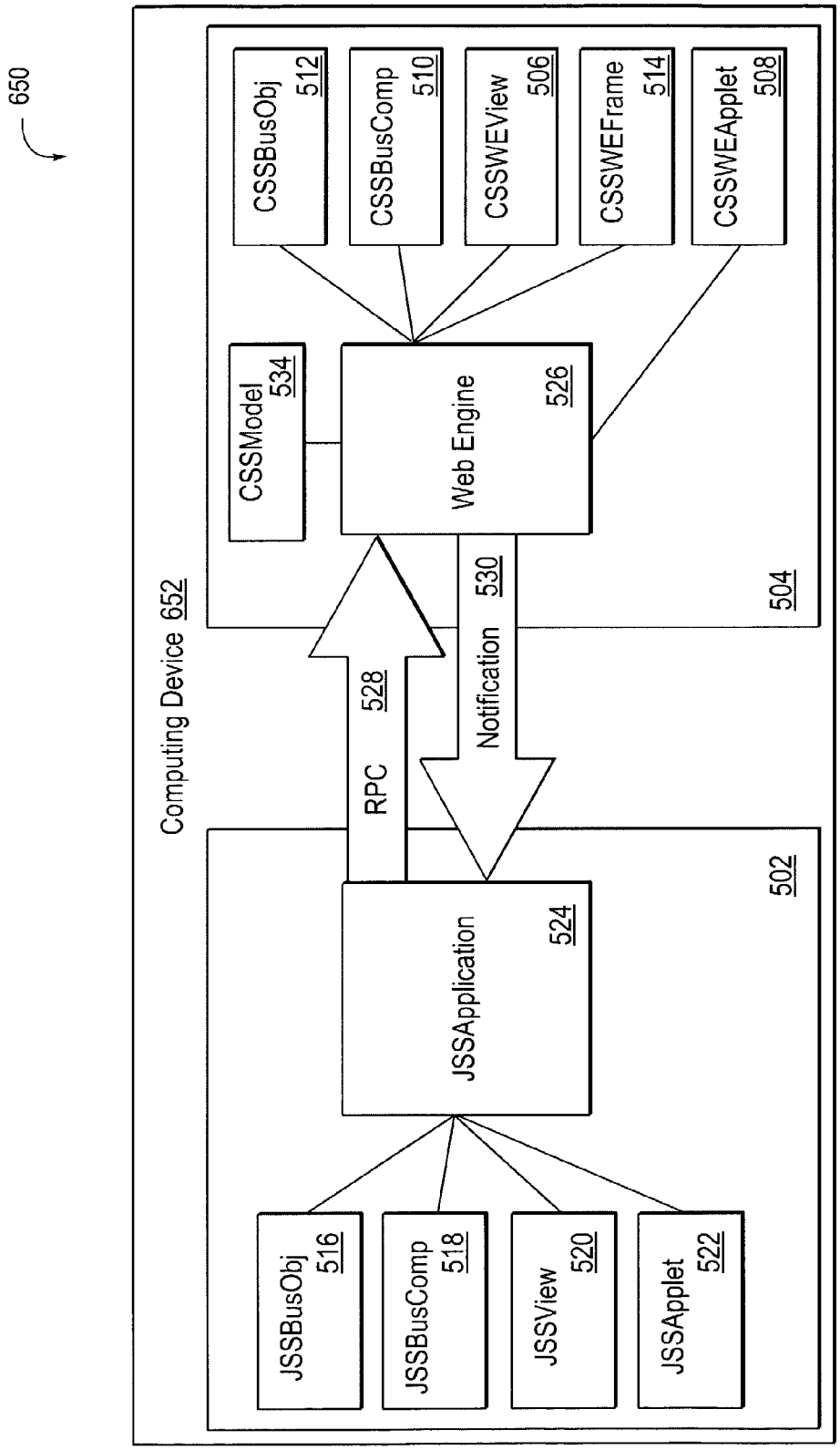
FIG. 6B illustrates an exemplary configuration in which objects on the browser and objects managed by the OM reside and operate on one computing device.

Objects 502 on the browser and objects 504 managed by the OM can be configured to reside and operate on one computing device or multiple computing devices. FIG. 6A illustrates an exemplary configuration 600 in which objects 502 on the browser and objects 504 managed by the OM reside and operate on multiple computing devices 602,604, including a client 602 and a server 604. FIG. 6B illustrates an exemplary configuration 650 in which objects 502 on the browser and objects 504 managed by the OM reside and operate on one computing device 652.

Returning to FIGS. 5A and 5B, objects 502 on the browser are generally synchronized with corresponding or mirrored objects 504 managed by the OM. Synchronization can be accomplished through a remote procedure call (RPC) mechanism 528 and a notification mechanism 530. The RPC mechanism 528 and the notification mechanism 530 will be described below in more details.

Of the objects 502 on the browser, the JSSApplication object 524 typically exists throughout a user-session. The JSSApplication object 524 should be initially loaded initially when the user starts an application. An application would generally be started when the user invokes a subset of the application from an icon on the desktop or from the Start menu. The JSSApplication object 524 generally performs a role similar to that of the CSSModel object 534. The CSSModel object 534 is generally a global session object that provides access to repository objects that are in use, the current business object instance in memory, the relationships between the current business object and the business components contained in it, and the user's global state information. The CSSModel object 534 generally accesses a repository 532 to obtain needed information. The repository 532 is generally a set of object definitions used to define an application or a suite of applications. However, the JSSApplication object 524 is generally scaled down to track one view, applets associated to the tracked view, one business object, and the business components that are in use in the view.

Unlike the JSSApplication object 524, the JSSView object 520, the JSSApplet object 522, the JSSBusObj object 516 and the JSSBusComp object 518 are typically temporary or impermanent entities, and are generally replaced when a page refresh occurs. For example, a request to navigate to a new view may cause a new set of JSSView 520, JSSApplet 522, JSSBusObj 516, and JSSBusComp 518 objects to be created to run on the browser.

Accordingly, objects 502 on the browser can be generally described as lightweight representations of mirrored or corresponding objects 504 managed by the OM. Each object 502 on the browser would typically include a subset of the functionalities included in corresponding objects 504 managed by the OM. For example, the JSSView object 520, similar to a CSSView object 506, generally represents a collection of applets. The JSSBusObj object 516, similar to a CSSBusObj object 512, generally manages the various one-to-many relationships between active business components so that correct relationships are employed when these active business components are populated via queries. The JSSBusObj object 516 generally exists on the browser for the life of the current view, and should be kept in sync with the corresponding CSSBusObj object 512.

In one embodiment, when the browser submits a request to navigate to a new view to the web engine 526, the web engine 526 would send a response containing the view layout that is devoid of data. Then the web engine 526 would send a response containing a string of data to populate the view.

The JSSApplication object 524 generally manages communications flowing into and out from objects on the browser. In one embodiment, a method invoked on an object on the browser would typically be directed to the JSSApplication object 524 if the invoked method should be retargeted to an object 504 managed by the OM. The JSSApplication object 524 would generally use the RPC mechanism 528 to route the invoked method through the web engine 526 to the appropriate object 504 managed by the OM. The web engine 526 would typically be employed to send return notifications and data from objects 504 managed by the OM to objects 502 on the browser. The web engine 526 would generally use the notification mechanism 530 to route notifications and data through the JSSApplication object 524 to objects 502 on the browser.

The browser objects 502 generally use the remote procedure calls 528 to invoke methods on the objects 504 managed by the OM. These remote procedure calls 528 are generally packaged as HTTP requests. Responses from the objects 504 managed by the OM are packaged as HTTP responses containing notifications and associated status information and data. In one embodiment, remote procedure calls are made with blocking enabled to ensure synchronization between the objects 502 on the browser and the objects 504 managed by the OM. With blocking enabled, control would typically not be passed back to the calling code until the called remote procedure finishes executing.

Remote Procedure Call (RPC)

Figure 7:
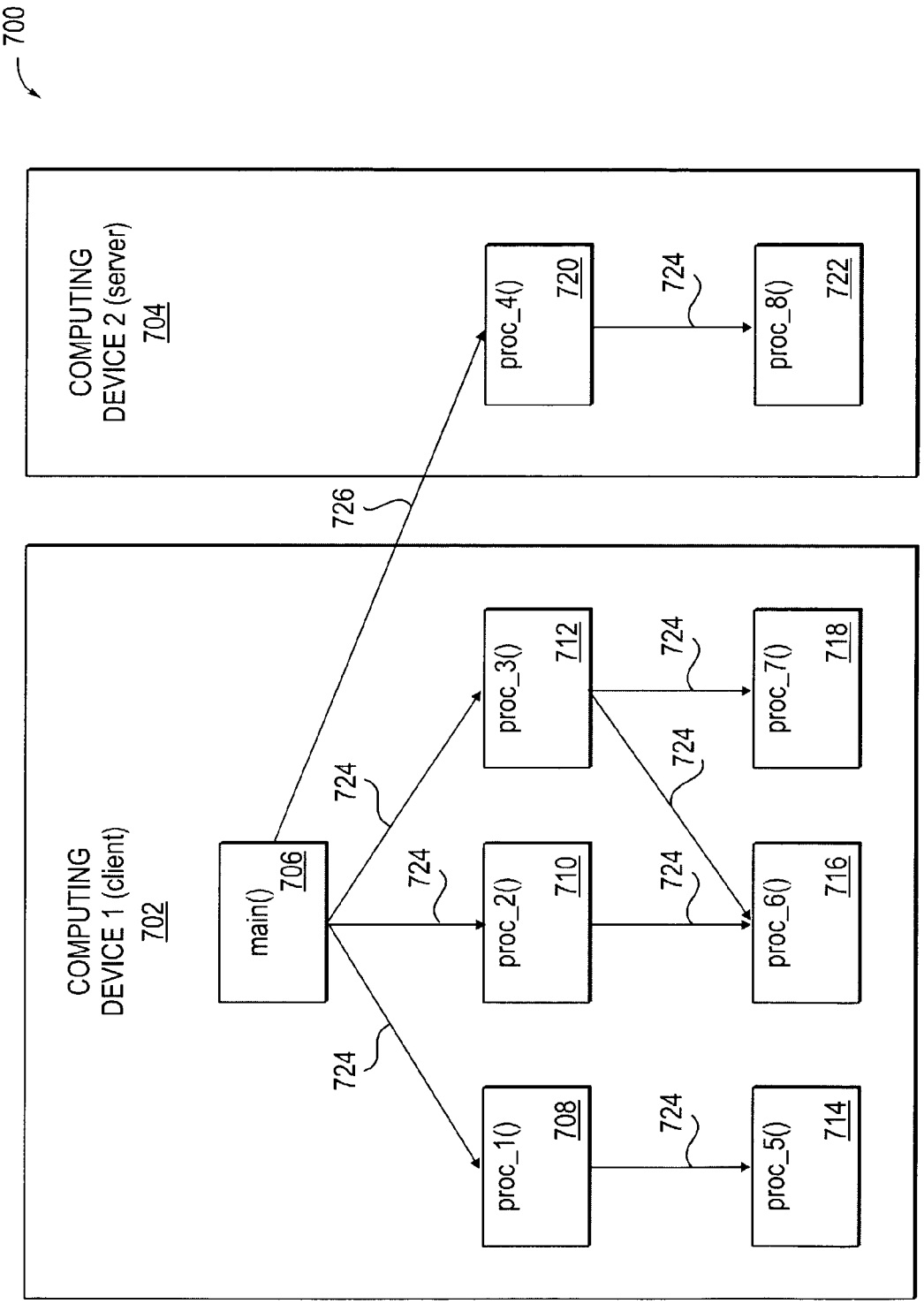
FIG. 7 illustrates an example of how the remote procedure call (RPC) paradigm can be used to divide a program into pieces that can be executed on separate computing devices.

The RPC model generally uses the same procedural abstraction as a conventional program, but allows a procedure call to span the boundary between two computers. FIG. 7 illustrates an example of how the RPC paradigm can be used to divide a program 700 into pieces that can be executed on separate computing devices 702,704. This figure generally shows a distributed program having multiple procedures. Main( )706, proc_1( )708, proc_2( )710, proc_3( )712, proc_5( )714, proc_6( )716, and proc_7( )718 reside and operate in the first computing device or the client 702; and proc_4( )720 and proc_8( )722 reside and operate in the second computing device or the server 704. A solid line 724 from procedure n to procedure m denotes a call from n to m. A dashed line 726 shows how control passes from one computing device to another computing device during a remote procedure call.

Figure 8:
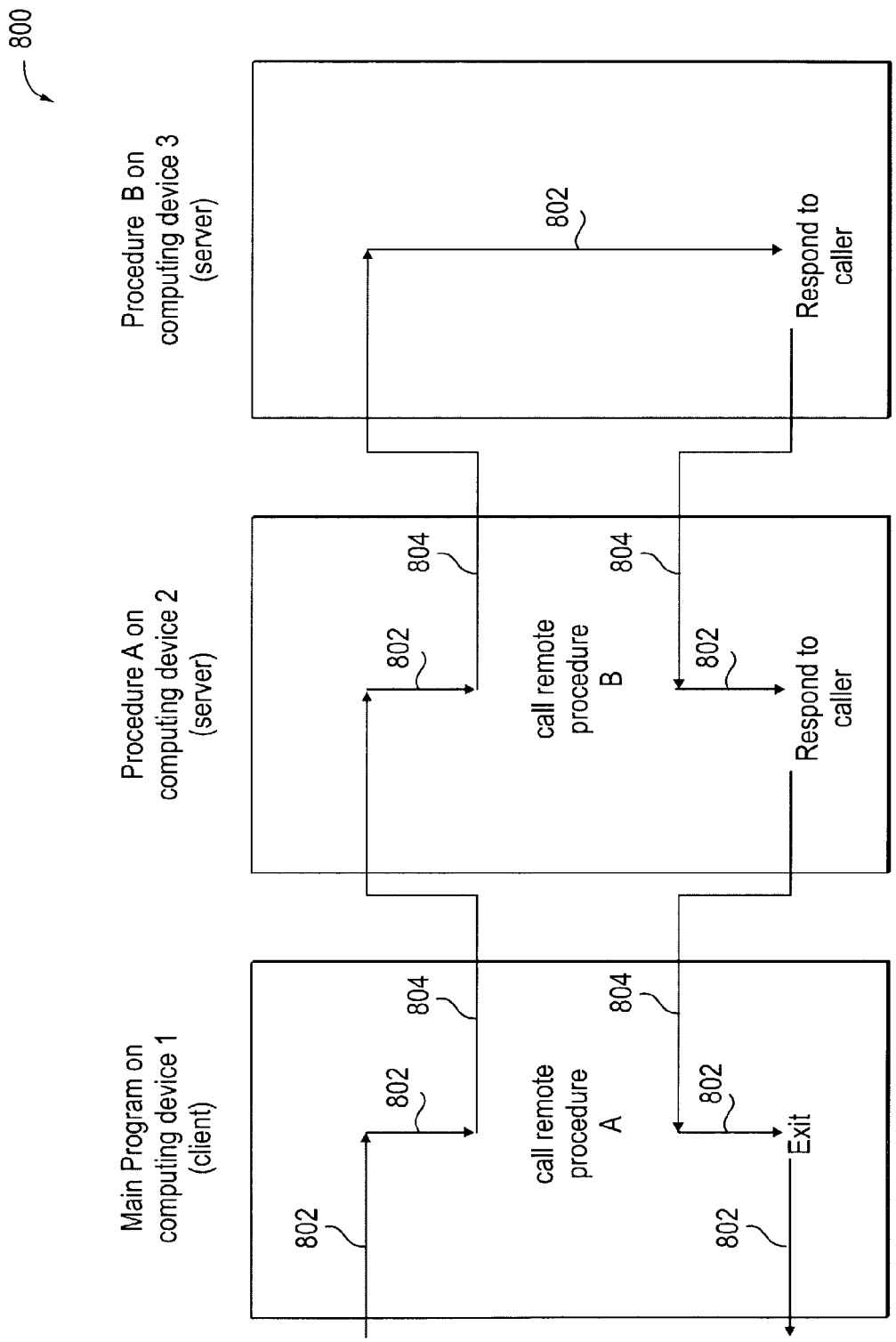
FIG. 8 illustrates an exemplary model of execution used with remote procedure calls.

FIG. 8 illustrates an exemplary model 800 of execution used with remote procedure calls. In this figure, solid lines 724 are generally used to denote flow control within a computing device; and dashed lines 726 are generally used to show how control passes from one computing device to another computing device during a remote procedure call.

As such, a remote procedure call generally executes a procedure located in a separate address space from the calling code. The RPC model is generally derived from the programming model of local procedure calls and takes advantage of the fact that every procedure contains a procedure declaration. The procedure declaration defines the interface between the calling code and the called procedure. The procedure declaration defines the call syntax and parameters of the procedure. Calls to a procedure should typically conform to the procedure declaration.

Applications that use remote procedure calls look and behave much like local applications. However, an RPC application is divided into two parts: a server, which offers one or more sets of remote procedures, and a client, which makes remote procedure calls to RPC servers. A server and its client(s) generally reside on separate systems and communicate over a network. RPC applications depend on the RPC runtime library to control network communications for them. The RPC runtime library generally supports additional tasks, such as finding servers for clients and managing servers.

A distributed application generally uses dispersed computing resources such as central processing units (CPU), databases, devices, and services. The following applications are illustrative examples of distributed applications:

A calendar-management application that allows authorized users to access the personal calendars of other users;

A graphics application that processes data on CPUs and displays the results on workstations; and A manufacturing application that shares information about assembly components among design, inventory, scheduling, and accounting programs located on different computers.

RPC software should generally meets the basic requirements of a distributed application including:

Clients finding the appropriate servers;

Data conversion for operating in a heterogeneous environment; and

Network communications

Distributed applications include tasks such as managing communications, finding servers, providing security, and so forth. A standalone distributed application needs to perform all of these tasks itself. Without a convenient mechanism for these distributed computing tasks, writing distributed applications is difficult, expensive, and error-prone.

RPC software typically provides the code, called RPC stubs, and the RPC runtime library that performs distributed computing tasks for applications. The RPC stubs and the RPC runtime library should be linked with client and server application code to form an RPC application.

Table 1 generally shows the basic tasks for the client and server of a distributed application. Calling the procedure and executing the remote procedure, shown in italicized text, are performed by the application code Oust as in a local application) but here they are in the client and server address spaces. As for the other tasks, some are performed automatically by the stubs and RPC runtime library, while others are performed by the RPC runtime library via API calls in the application code.

TABLE 1

Basic Tasks of an RPC Application

| Client Tasks | Server Tasks |
|---|---|
| | 1. Select network protocols |
| | 2. Register RPC interfaces |
| | 3. Register endpoints in endpoint map |
| | 4. Advertise RPC interfaces and objects in the namespace |
| | 5. Listen for calls |
| 6. Find compatible servers that offer the procedures | |
| 7. Call the remote procedure | |
| 8. Establish a binding with the server | |
| 9. Convert input arguments into network data | |
| 10. Transmit arguments to the server's runtime | |
| | 11. Receive call |
| | 12. Disassemble network data and convert input arguments into local data |
| | 13. Locate and invoke the called procedure |
| | 14. Execute the remote procedure |
| | 15. Convert the output arguments and return value into network data |
| | 16. Transmit results to the client's runtime |
| 17. Receive results | |
| 18. Disassemble network data and convert output arguments into local data | |
| 19. Return results and control to calling code | |

Figure 9:
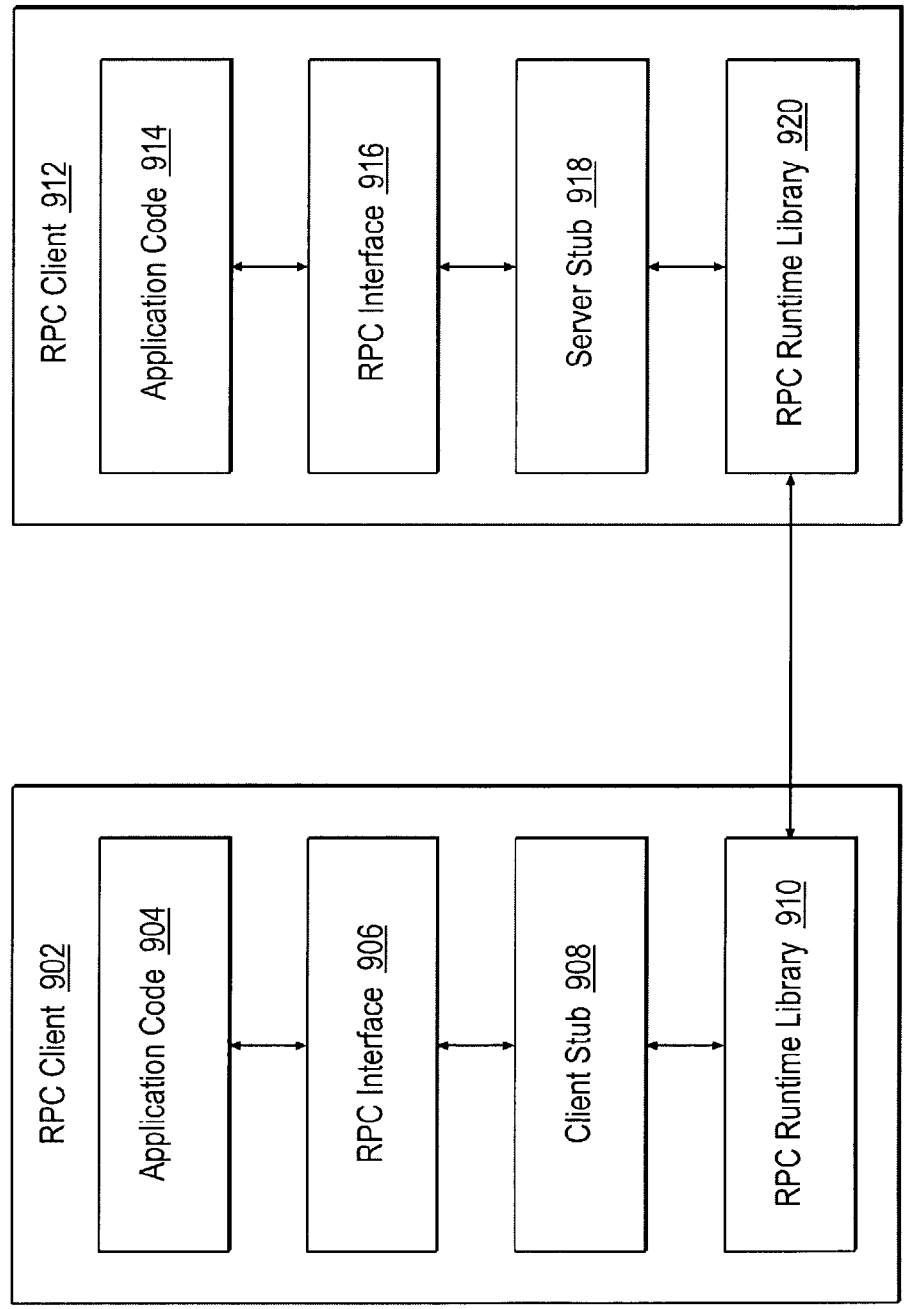
FIG. 9 generally shows an exemplary partitioning of RPC application code segments, RPC interfaces, client and server stubs, and the RPC runtime libraries in the RPC client and the RPC server.

FIG. 9 generally shows an exemplary partitioning 900 of RPC application code segments 904 and 914, RPC interfaces 906 and 916, client and server stubs 908 and 918, and the RPC runtime libraries 910 and 920 in the RPC client 902 and the RPC server 904.

The RPC client 902 or the RPC server 912 typically contains RPC application code segments 904 and 914, RPC interfaces 906 and 916, stubs 908 and 918, and the RPC runtime libraries 910 and 920. The RPC application code segments 904,914 are generally the code written for a specific RPC application by the application developer. The RPC application code segments 904,914 generally implement and call remote procedures, and also calls needed routines or procedures in the RPC runtime library. An RPC stub 908,918 is generally an interface-specific code module that uses an RPC interface 906,916 to pass and receive arguments. A client 902 and a server 912 typically contain complementary RPC stubs 906,916 for each shared RPC interface 906,916. The RPC runtime library 910,920 generally manages communications for RPC applications. In addition, the RPC runtime library 910,920 should support an Application Programming Interface (API) used by RPC application code to enable RPC applications to set up their communications, manipulate information about servers, and perform optional tasks such as remotely managing servers and accessing security information.

RPC application code segments 904,914 usually differ for clients and servers. RPC application code 914 on the server 912 typically contains the remote procedures that implement one RPC interface. RPC application code 904 on the corresponding client 902 typically contains calls to those remote procedures.

RPC stubs 908,918 generally perform basic support functions for remote procedure calls. For instance, RPC stubs 908,918 prepare input and output arguments for transmission between systems with different forms of data representation. RPC stubs 908,918 use the RPC runtime library 910,920 to handle the transmission between the client 902 and server 904. RPC stubs 908 on the client 902 can also use the local RPC runtime library 910 to find appropriate servers for the client 902.

Figure 10:
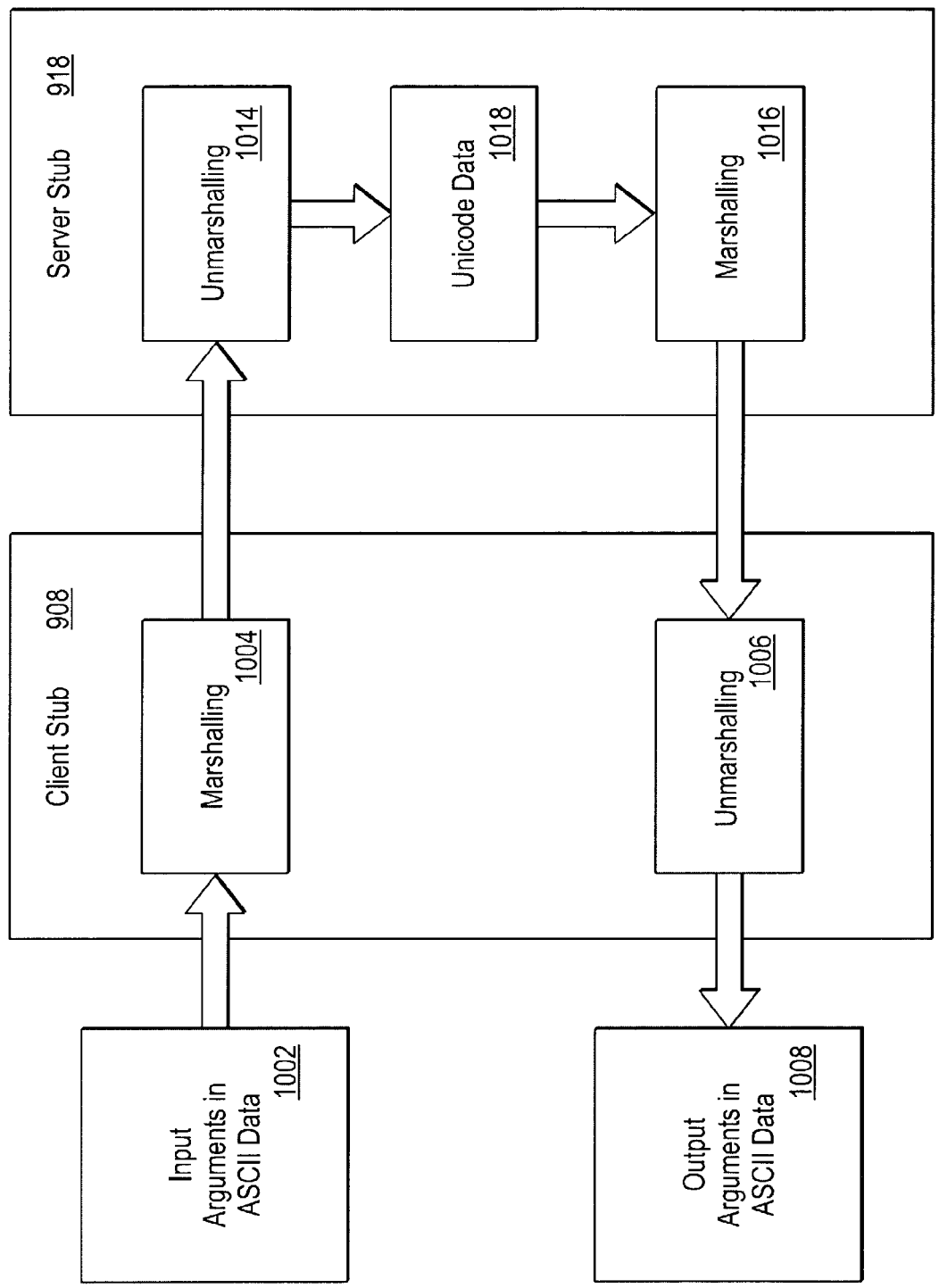
FIG. 10 generally shows an exemplary marshalling and unmarshalling between client data structures and server data structures.

FIG. 10 generally shows an exemplary marshalling and unmarshalling between client data structures and server data structures. When the client RPC application code calls a remote procedure, the client RPC stub 908 should prepare the input arguments 1002 for transmission. The process for preparing arguments for transmission is known as "marshalling."

Marshalling 1004 generally converts input or call arguments 1002 into a byte-stream format and packages them for transmission. Upon receiving call arguments, a server RPC stub 918 unmarshalls 1014 them. Unmarshalling 1014 is generally the process by which a stub disassembles incoming network data and converts it into application data using a format that the local system understands. Marshalling 1004, 1016 and unmarshalling 1014,1006 both occur twice for each remote procedure call. The client RPC stub 908 marshalls 1004 input arguments 1002 and unmarshalls 1006 output arguments 1008. The server RPC stub 918 unmarshalls 1014 input arguments 1006 and marshalls 1016 output arguments 1008. Marshalling and unmarshalling permit client and server systems to use different data representations for equivalent data. For example, the client system can use ASCII data 1002,1008 and the server system can use Unicode data 1018 as shown in FIG. 10.

The IDL compiler (a tool for application development) generates stubs by compiling an RPC interface definition written by application developers. The compiler generates marshalling and unmarshalling routines for platform-independent IDL data types. To build the client for an RPC application, a developer links client application code with the client stubs of all the RPC interfaces the application uses. To build the server, the developer links the server application code with the corresponding server stubs.

In addition to one or more RPC stubs, each RPC server and RPC client should be linked with a copy of the RPC runtime library. The RPC runtime library generally provides runtime operations such as controlling communications between clients and servers and finding servers for clients on request. RPC stubs in the client and the server typically exchange arguments through the RPC runtime library that is respectively local to the client and the server. The RPC runtime library on the client typically transmits remote procedure calls to the server. The RPC runtime library on the server generally receives the remote procedure calls from the client and dispatches each call to the appropriate RPC stub on the server. The RPC runtime library then sends the results of each call to the RPC runtime library on the client.

RPC application code on the server must also contain server initialization code that calls routines in the RPC runtime library on the server when the server is starting up and shutting down. RPC application code on the client can also call RPC runtime library routines for initialization purposes. Furthermore, RPC application code on the server and RPC application code on the client can also contain calls to RPC stub-support routines. RPC stub-support routines generally allow applications to manage programming tasks such as allocating and freeing memory.

Figure 11:
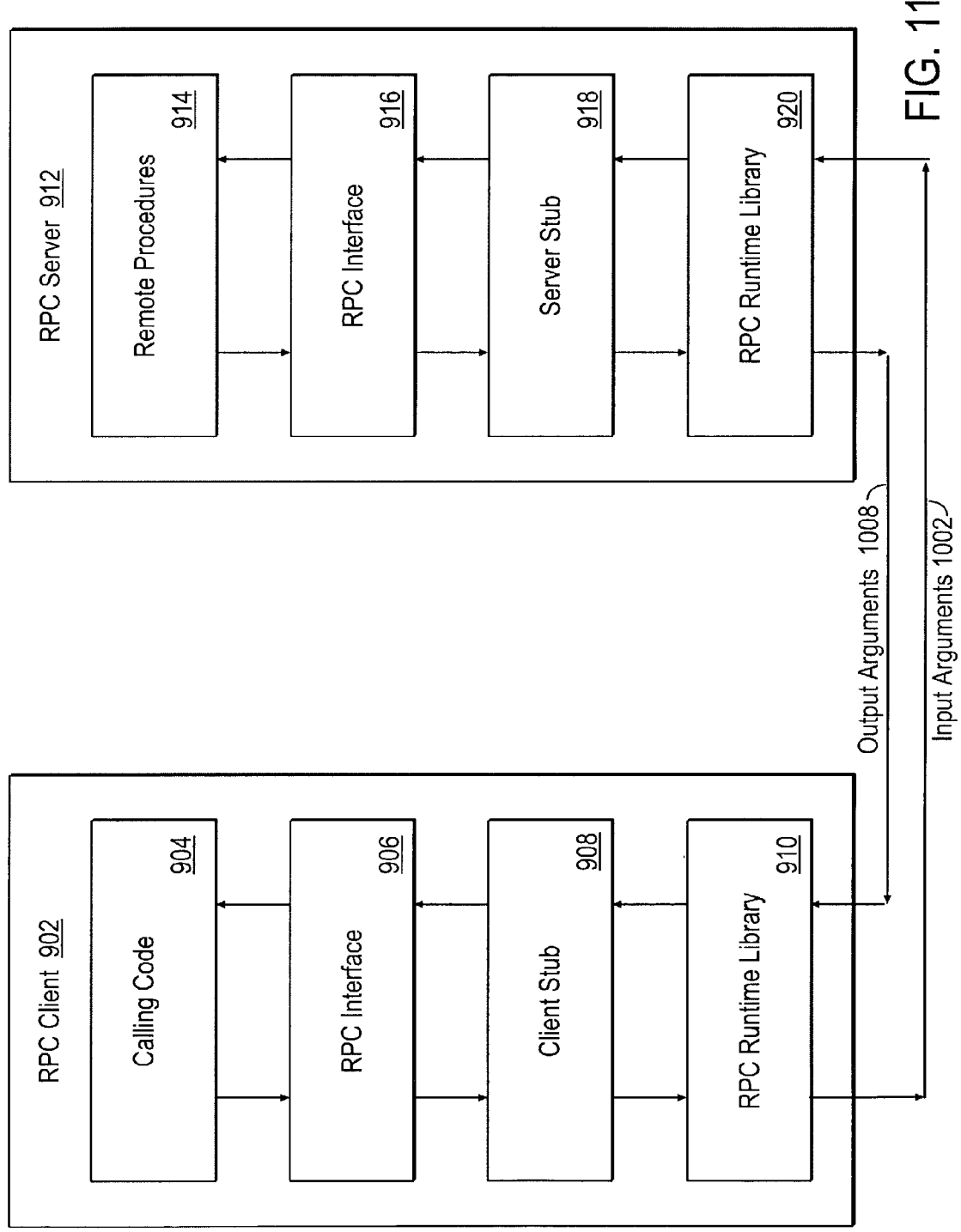
FIG. 11 generally shows exemplary roles of RPC application code segments, RPC interfaces, RPC stubs, and RPC runtime libraries during a remote procedure call.

FIG. 11 generally shows exemplary roles of RPC application code segments 904 and 914, RPC interfaces 906 and 916, RPC stubs 908 and 918, and RPC runtime libraries 910 and 920 during a remote procedure call. The client's application code or calling code 908 invokes a remote procedure call, passing the input arguments 1002 through the client's RPC interface 906 to the client stub 908. The client stub 908 marshalls the input arguments 1002 and dispatches the call to the client's RPC runtime library 910. The client's RPC runtime library 910 transmits the input arguments 1002 to the server's RPC runtime library 920, which dispatches the call to the server stub 918 for the RPC interface 916 of the called procedure. The server's stub 918 unmarshalls the input arguments 1002 and passes them to the called remote procedure 914. The server's application code or remote procedure 914 executes and then returns any output arguments 1008 to the server stub 918. The server stub 918 marshalls the output arguments 1008 and returns them to the server's RPC runtime library 920. The server's RPC runtime library 920 transmits the output arguments 1008 to the client's RPC runtime library 910, which dispatches them to the client stub 901. The client's stub 908 unmarshalls output arguments 1008 and returns them to the calling code 904.

In one embodiment, remote procedure calls are made with blocking enabled to ensure synchronization between the objects 502 on the browser and the objects 504 managed by the OM (shown in FIGS. 5A and 5B). With blocking enabled, control would typically not be passed back to the calling code until the called remote procedure finishes executing.

Figure 12:
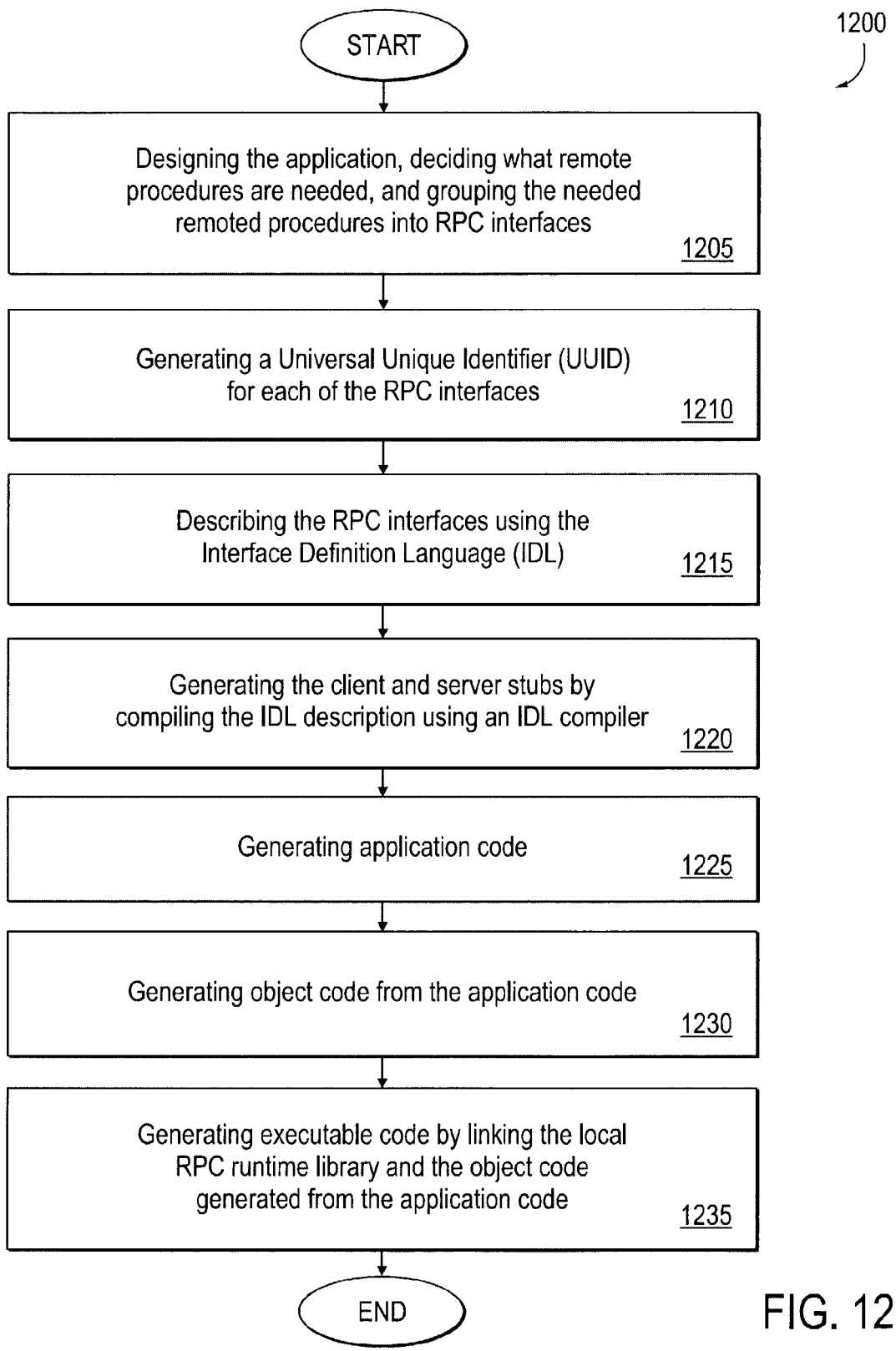
FIG. 12 generally outlines an exemplary process 1200 of building a distributed RPC application.

FIG. 12 generally outlines an exemplary process 1200 of building a distributed RPC application. The process generally includes the following basic tasks:

Designing the application, deciding what procedures are needed and which of the needed procedures will be remote procedures, and deciding how the remote procedures will be grouped into RPC interfaces (block 1205);

Using the Universal Unique Identifier (UUID) generator to generate a UUID for each of the RPC interfaces (block 1210);

Using the Interface Definition Language (IDL) to describe the RPC interfaces for planned data types and remote procedures (block 1215);

Generating the client and server stubs by compiling the IDL description using an IDL compiler (block 1220);

Writing or modifying application code using a programming language that is compatible with the RPC stubs, so that the application code works with the stubs (block 1225);

Generating object code from application code (block 1230); and

Linking the local RPC runtime library and the object code generated from the application code to generate executable code (block 1235).

Figure 13:
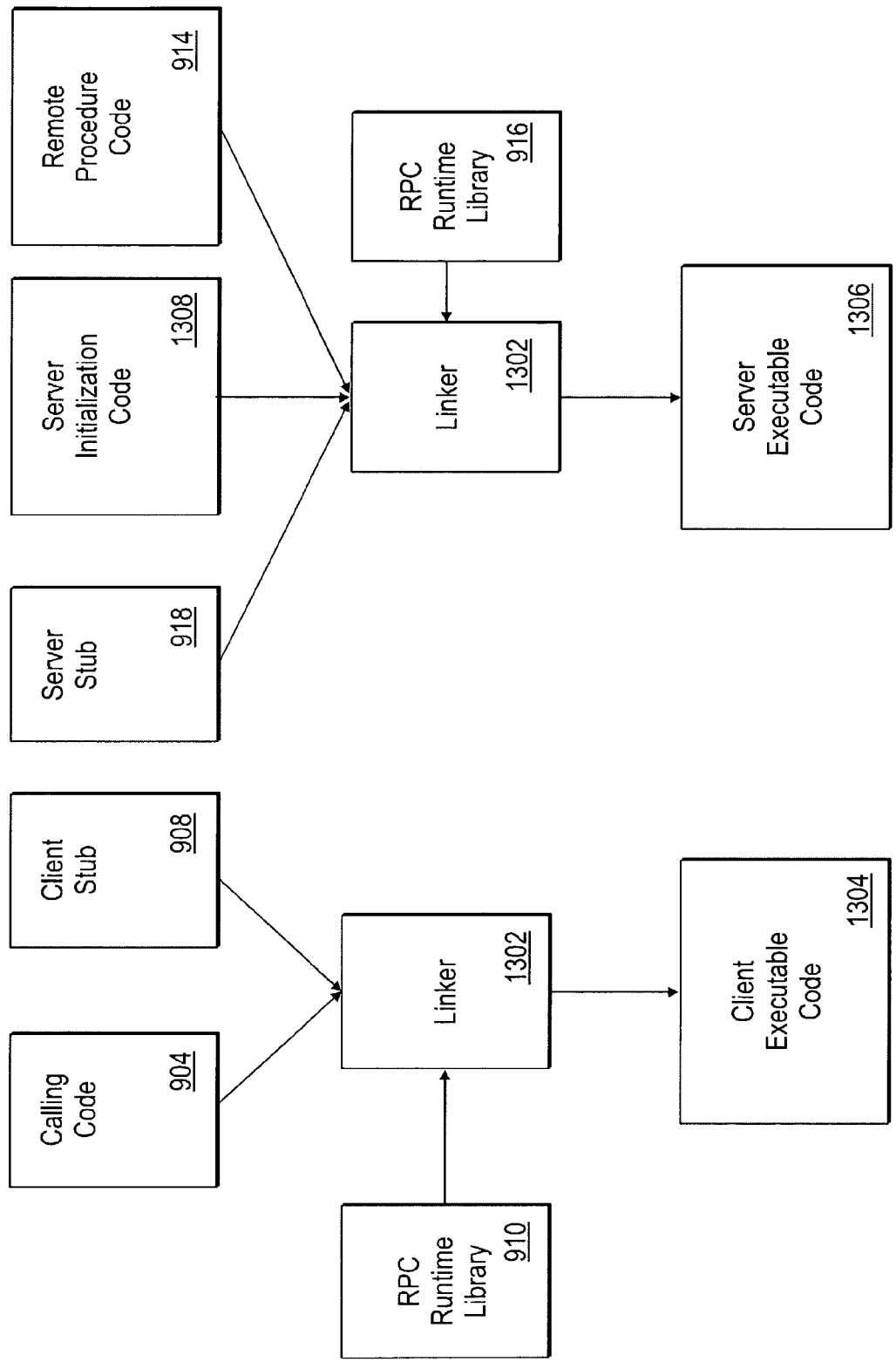
FIG. 13 generally illustrates the linking of the local RPC runtime library and the object code generated from the application code.

FIG. 13 generally illustrates the linking of the local RPC runtime library and the object code generated from the application code. For the client, object code of the client stub 908, the client application code or calling code 904, and the client's RPC runtime library 910 are linked using a linker 1302 to generate the client executable code 1304. For the server, object code for the server stub 918, the server's initialization code 1308, the server's application code or remote procedures 914, and the server's RPC runtime library 916 are linked using the linker 1302 to generate the server executable code 1306.

Traditionally, calling code and called procedures share the same address space. In an RPC application, the calling code and the called remote procedures are not linked; rather, they communicate indirectly through an RPC interface. An RPC interface is generally a logical grouping of operations, data types, and constants that serves as a contract for a set of remote procedures. RPC interfaces are typically compiled from formal interface definitions written by application developers using the Interface Definition Language (IDL).

In developing a distributed application, an interface definition should be defined in IDL. The IDL compiler generally uses the interface definition to generate a header file, a client stub file, and a server stub file. The IDL compiler can produce header files in a standard programming language, and stubs as source files or as object file. For some applications, an Attribute Configuration File (ACF) accompanying the interface definition may be defined. If an ACF exists, the IDL compiler interprets the ACF when it compiles the interface definition. Information in the ACF is used to modify the code that the compiler generates.

The header of each RPC interface typically contains a Universal Unique Identifier (UUID), which is a hexadecimal number that uniquely identifies an entity. A UUID that identifies an RPC interface is generally known as an interface UUID. The interface UUID ensures that the interface can be uniquely identified across all possible network configurations. In addition to an interface UUID, each RPC interface contains major and minor version numbers. Together, the interface UUID and version numbers form an interface identifier that identifies an instance of an RPC interface across systems and through time.

Notifications

Returning to FIGS. 5A and 5B, objects 502 on the browser are generally synchronized with corresponding or mirrored objects 504 managed by the OM so that changes can be reflected. Synchronization can be accomplished through a remote procedure call (RPC) mechanism 528 and a notification mechanism 530.

The notification mechanism 530 generally provides the means by which data in an object 502 on the browser (e.g., JSSBusComp 518) can be updated when data or status is changed in a corresponding object 504 managed by the OM (e.g., CSSBusComp 510). In one embodiment, the CSSSW-EView object 506 would collect one or more notifications, and send them to the objects 502 on the browser at the end of a view show cycle.

In one embodiment, the following exemplary or illustrative notifications can be transmitted. It should be noted that some of the notifications listed below require parameters. In other cases, the framework can understand the context for these notifications by simply knowing its current state.

NotifyBeginNotifys—Indicates the start of a set of notifications.

NotifyEndNotifys—Indicates the end of a set of notifications

NotifyStateChanged—Indicates that there has been a change of state. An exemplary scenario in which a change of state may occur is when the system goes into a query state (where the user can enter query conditions execute a query), and then goes into a commit pending state (where the user can update the data values).

NotifyBeginQuery—Indicates that the business component is in a state ready to accept query conditions NotifyExecute—Indicates that the business component has been executed (i.e., has executed a query on the database and repopulated itself with fresh data). This notification can include an optional parameter to provide query specifications.

NotifyEndQuery—Indicates that a query has been completed.

NotifyDeleteRecord—Indicates that a record has been deleted from the database.

NotifyDeleteWorkSet—Indicates that a record has been removed from the working set. This notification can include a parameter that provides the index of the working set row that needs to be removed.

NotifyInsertWorkSet—Indicates that a record has been added to the current working set. This notification can include parameters to provide the index of the new record in the working set.

NotifyInsertWSFieldVals—Indicates that certain value(s) need to be added to a field in the working set.

NotifyNewActiveField—Indicates that a new field is active or current.

NotifyNewActiveRow—Indicates that a new row (i.e., record) is active or current.

NotifyNewData—Indicates that there has been change(s) in the data.

NotifyNewDataWS—Indicates that there has been change(s) in the data in the working set.

NotifyNewFieldData—Indicates that a particular field has new data. This notification includes parameter that provides the name of the field.

NotifyNewFieldQuerySpec—Indicates that a particular field has a new query or search specification.

NotifyNewPrimary—Indicates that a new record has become the primary record.

NotifyNewRecord—Indicates that a new record has been created.

NotifyNewRecordData—Indicates that a newly created record has new data.

NotifyNewRecordDataWS—Indicates that a newly created record has new data that to be populated into the working set.

NotifyNewSelection—Indicates the selection and de-selection of a record.

NotifyNewSellds—Indicates the selection of multiple records.

NotifyPageRefresh—Indicates that the Ul needs to be refreshed. This notification is typically used when a generally substantial change in the Ul is required rather than just updating data. This notification can cause a server trip to fetch a new page and display it in the browser.

NotifyScrollData—Indicates that the records need to be scrolled up or down. Certain User Interface objects, such as list applets, can use this notification to scroll up and down to show different rows.

NotifyChangeSelection—Indicates that there has been a change in record selection (i.e., the current row has either been selected or deselected).

NotifySelModeChange—Indicates a change in the selection mode. In one embodiment, there can be two modes of selection, including (i) selection of one record at a time and (ii) selection of multiple records simultaneously (e.g., deleting multiple records with one command).

NotifyTotalsChanged—Indicates that total values need to be changed. In some cases when multiple records are displayed, some fields may also display the summation of values in all the records. This notification indicates that total value has changed.

NotifyLongOpProgress—Indicates that a long (i.e. time consuming) action is in progress. This notification is used by the User Interface to provide feedback to the user, such as showing a progress or status bar showing how much of the task is currently complete.

NotifyGeneric—This is a generic notification used to notify the User Interface object of some special conditions that are not covered by set of notifications listed and described above. Each type of generic notification can include a parameter providing a name for the generic notification so that one type of generic notification can be distinguished from another type of generic specification. Each type of generic notification can include its unique parameters.

General Communication Processes

As stated above, objects on the browser and objects managed by the OM can be configured to reside and operate on one or multiple computing devices. As shown above, FIG. 6A illustrates an exemplary configuration 600 in which objects 502 on the browser and objects 504 managed by the OM reside and operate on multiple computing devices 602 and 604, including a client 602 and a server 604. FIG. 6B illustrates an exemplary configuration 650 in which objects 502 on the browser and objects 504 managed by the OM reside and operate on one computing device 652.

Figure 14:
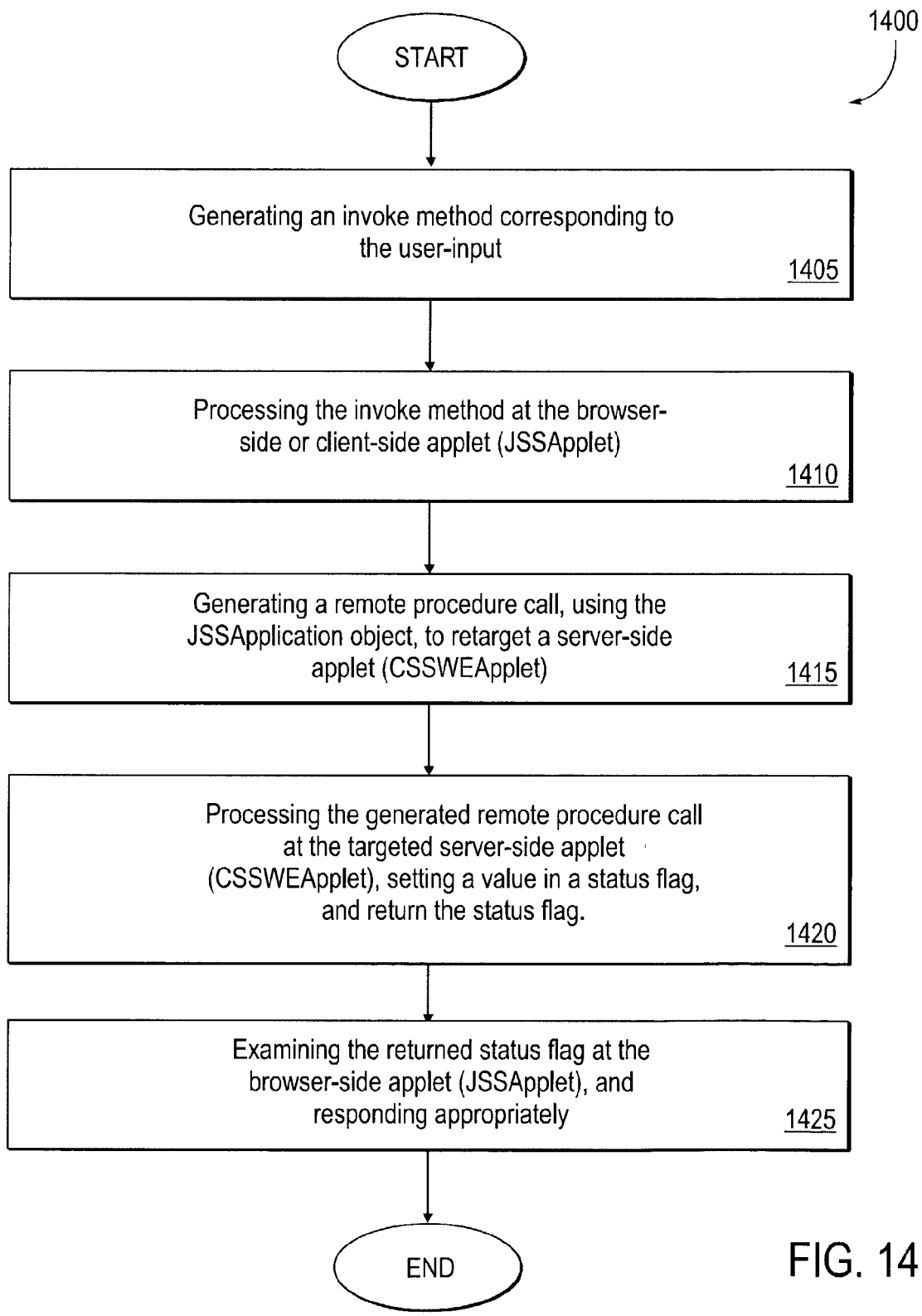
FIG. 14 generally illustrates an exemplary process of communication between the browser-side or client-side objects and server-side objects running on a multiple-devices configuration shown in FIG. 6A.

FIG. 14 generally illustrates an exemplary process 1400 of communication between the browser-side or client-side objects 502 and server-side objects 504 running on a multiple-device configuration 600 shown in FIG. 6A. The exemplary process 1400 of communication of FIG. 14 is typically by user input and is handled first at browser-side applet, JSSApplet (block 1405). When the user clicks on a link or other user interface feature, an invoke method is generated. The JSSApplet is typically the first object to receive the generated invoke method (block 1410). The JSSApplet can then issue a remote procedure call, by way of the JSSApplication, to retarget the invoke method to the server-side applet, CSSWEApplet (block 1415). The targeted server-side applet, CSSWEApplet, can generally respond to an RPC invoke method from the browser-side applet, JSSApplet, by setting a status flag (block 1420). In one embodiment, the status flag can be set to one the following values:

Continue—This value generally indicate that the server-side applet, CSSWEApplet, has performed its share of handling the invoke method (or has no role to perform), and that the JSSApplet on the browser needs to complete the action. Notifications are provided in the response, but are often empty.

Completed—This value generally indicates that the server-side applet has completed the handling of the invoke method, and that the browser needs to perform no further action other than to respond to notifications provided in the response.

NewPage—This value generally indicates that the response to the invoke request or other command requires a page refresh on the browser, including re-a generation all the temporary browser-side objects. A URL is sent to the browser, so that the new page can be obtained. However, there will no notifications. This value is typically set in cases such as when a drilldown to a different view is requested.

Error—This value generally indicates that the invoke method request failed. Upon receiving an Error status, the JSSApplet would typically display an error page.

When a browser-side applet, JSSApplet, calls the server through the RPC, the browser-side applet typically looks at the status flag in the response and then handles it (block 1425). If the returned status is Error, the browser-side applet would show an error page. If the returned status is Completed, the server is generally indicating that it had already handled the invoke method and that there's nothing left for the browser to do. If the returned status is Continue, the server is generally indicating that it is not handling the invoke method. The browser-side applet would generally respond to a returned status of Continue by redirecting the method to a JSSBusComp object by invoking the method directly on a JSSBusComp object. The JSSBusComp object may be able to satisfy the invoke method request, or may have to send its own RPC call through the JSSApplication to its corresponding server-side business component.

Figure 15:
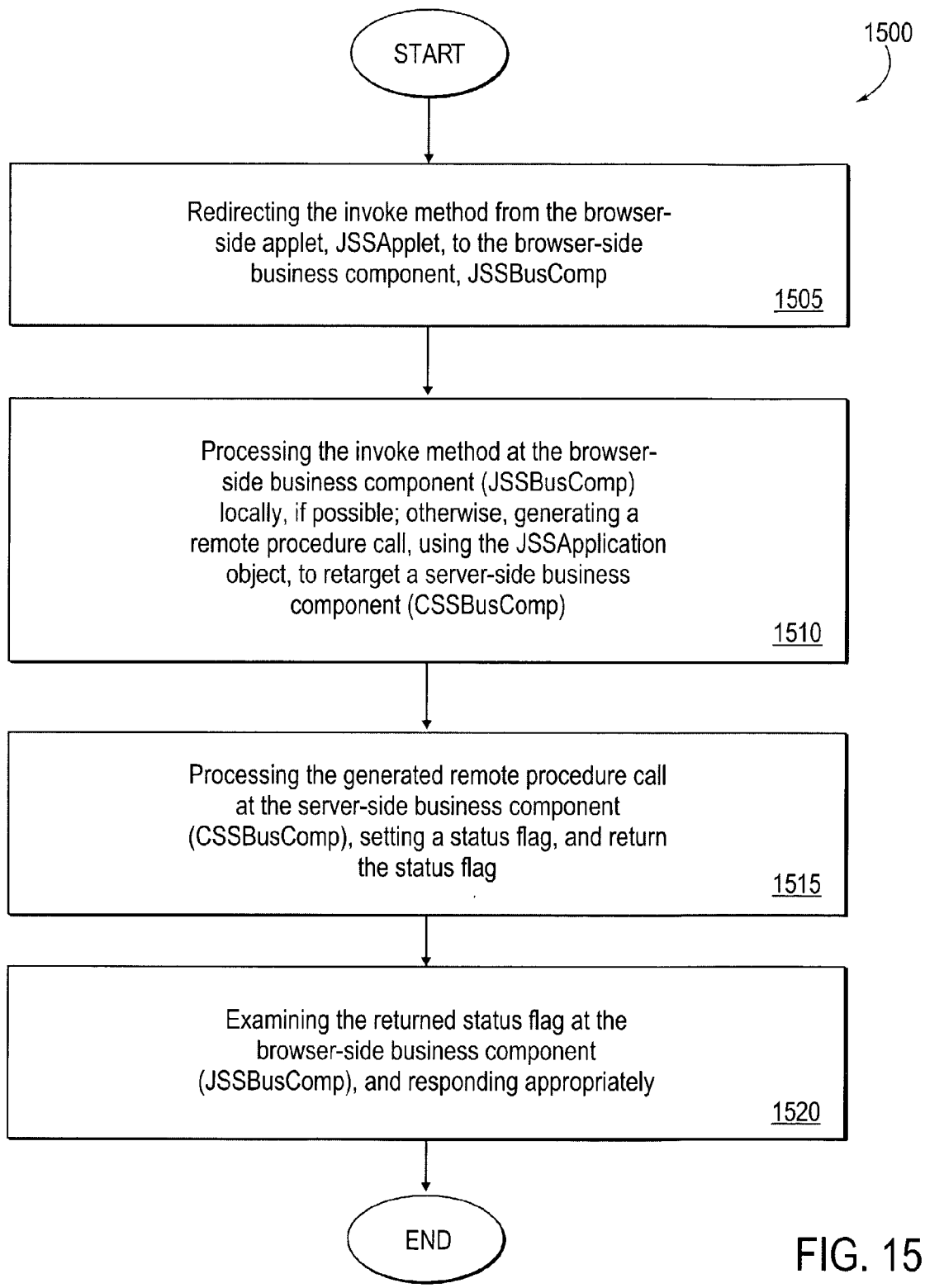
FIG. 15 shows an exemplary process of communication in which the browser-side applet invokes the method directly on the JSSBusComp object.

FIG. 15 shows an exemplary process 1500 of communication in which the browser-side applet invokes the method directly on the JSSBusComp object. It should be noted that the process 1500 of FIG. 15 will be described below as though the process had occurred in a multiple-device configuration shown in FIG. 6A. In block 1505, the browser-side applet, JSSApplet, redirects the method to the JSSBusComp object. In block 1510, the client-side business component object, JSSBusComp, would then issue a remote procedure call, through JSSApplication object, to a server-side business component, CSSBusComp. The server-side business component generally processes the RPC method call, sets and sends back a status, and also returns a set of notifications in appropriate cases (block 1515). In one embodiment, the status flag can have the following values:

Completed—This value generally indicates the server-side business component, CSSBusComp, had generally processed the invoke method successfully. Notifications will typically occur.

Error—This value generally indicates that the server-side business component, CSSBusComp, had unsuccessfully processed the invoke method call. Upon receiving a returned status of Error, the browser would typically display an error page.

In block 1520, the client-side business component (JSSBusComp) examines the returned status flag and responds appropriately. It should be noted that the server will be contacted if an invoke method call performs actions that would require synchronization between the browser and server business components. It should be further noted that there could be circumstances where the JSSBusComp object may be able to handle the request locally without needing to contact the server. An example of such circumstances is when the user performs a next record operation and then a previous record operation without changing any data.

Alternate Client-Server Embodiments

Some portions of the following description are presented in terms of components, which may be understood to be components of a system or apparatus, objects of code, other portions of code, portions of a program, or other pieces of a whole which may be expected to function collectively, in some cases with some independence between the pieces.

Figure 16A:
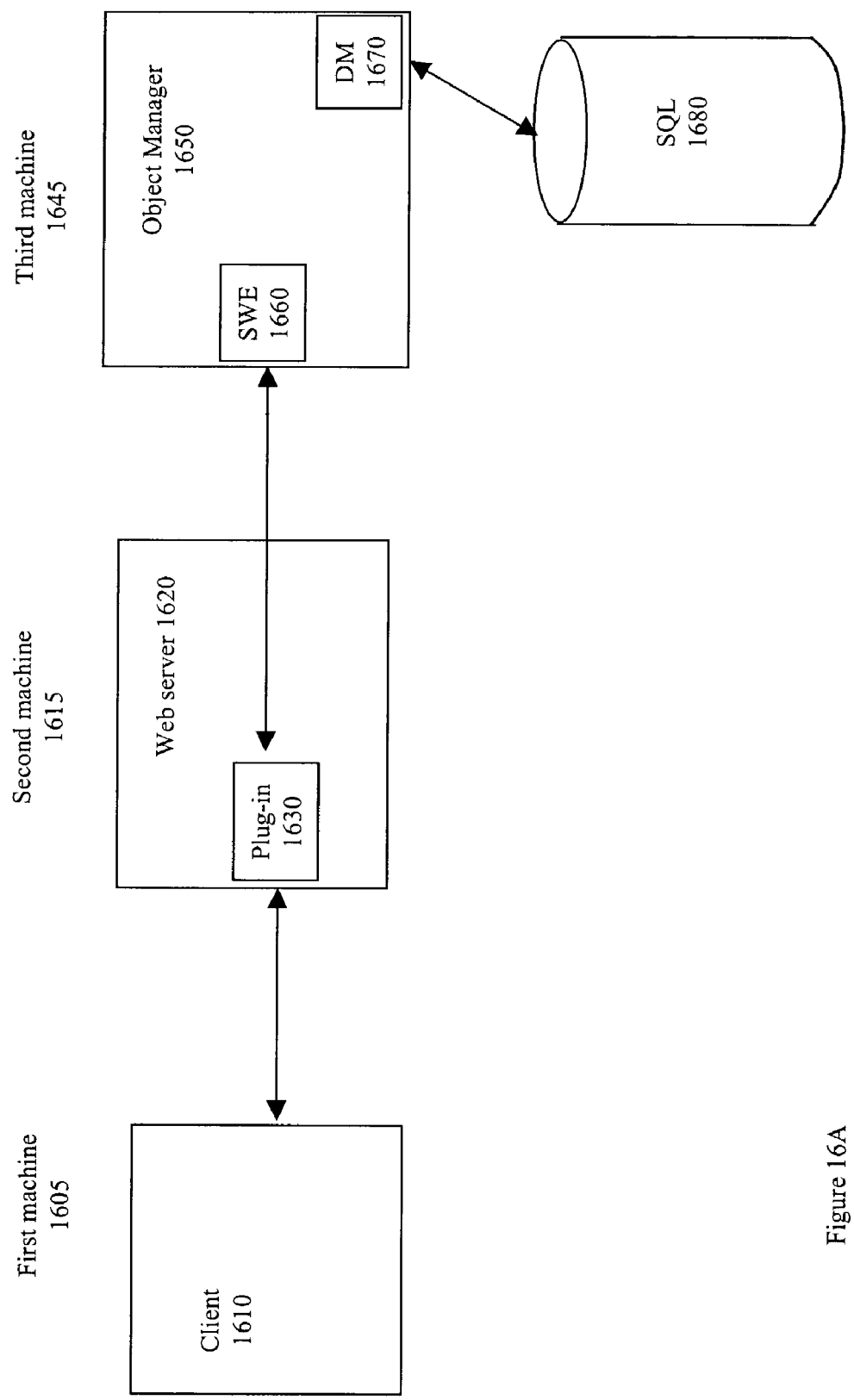
FIG. 16A illustrates an embodiment of a web application.

FIG. 16A illustrates an embodiment of a web application. Client 1610 runs (is executed) on first machine 1605. Client 1610 utilizes an interface between the first machine 1605 and the second machine 1615 to couple to plug-in 1630. Typically, the interface between first machine 1605 and second machine 1615 will be the world wide web, an internet, or some other form of network suitable for connection of machines. Web server 1620 runs on second machine 1615 to service requests from the interface with first machine 1605, and plug-in 1630 is a portion of web server 1620 which is suitable for handling requests from client 1610. Note that plug-in 1630 may be a specialized component designed for use primarily or exclusively with client 1610 and supplied by an entity other than the entity expected to supply the web server 1620. Alternatively, plug-in 1630 may be a portion of web server 1620 which is suitable for handling requests from client 1610.

Plug-in 1630 recognizes requests from client 1610 and redirects those requests to SWE 1660 through an interface between second machine 1615 and third machine 1645 (such as another world wide web or internet interface for example). Such redirection may include massaging, transforming, or otherwise manipulating data forming the request in question, or it may simply include passing requests on to the SWE 1660 unchanged. SWE 1660 is part of object manager 1650 along with data manager 1670, all of which run on third machine 1645. Typically, requests from client 1610 will result in accesses of data in SQL repository (database) 1680, which is accessible by third machine 1645. Note that web server 1620 and object manager 1630 may be run on a single machine, rather than two separate machines, while still maintaining similar or identical logical relationships.

Figure 16B:
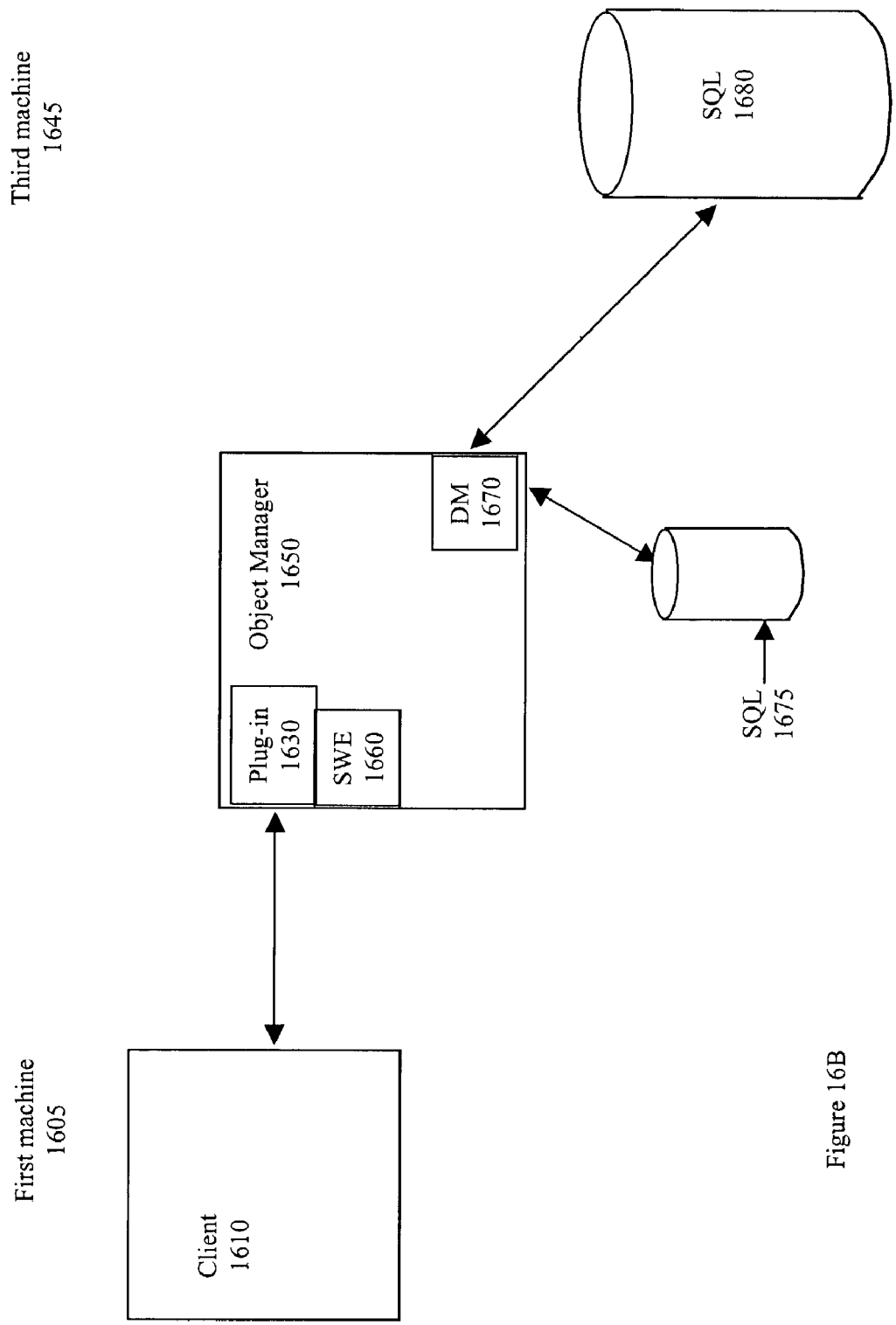
FIG. 16B illustrates an alternate embodiment of a web application.

FIG. 16B illustrates an alternate embodiment of a web application. First machine 1605 is suitable for either standalone operation or operation in conjunction with a connection to third machine 1645 or a similar machine allowing for access to SQL repository 1680. Client 1610 runs on first machine 1605, along with object manager 1650. Plug-in 1630 is integrated as a component or portion of object manager 1650, allowing for the same interface with client 1610 illustrated in FIG. 16A, without the need for the intervening network connection. Thus, plug-in 1630 of FIG. 16B may use the same or essentially the same code or other implementation as was used for the embodiment illustrated in FIG. 16A.

Plug-in 1630 passes on requests to SWE 1660 which interacts with data manager 1670. Data manager 1670 determines on a frequent (potentially near continuous or alternatively regular) basis whether a connection to third machine 1645 is present. When such a connection is present, data manager 1670 accesses SQL database 1680 on third machine 1645 for purposes of handling requests. When such a connection is not present, data manager 1670 accesses local SQL database 1675 on first machine 1605 for purposes of handling requests.

In one embodiment, local SQL database 1675 is a scaled-down or limited copy of database 1680. In an alternate embodiment, local database 1675 is a copy of database 1680. Note that in either embodiment, synchronization of database 1680 with local database 1675 may be handled with a variety of well-known methods. For example, data manager 1670, in one embodiment, may handle synchronization of database 1680 with database 1675. Such synchronization will necessarily only occur when a link is present between first machine 1605 and third machine 1645. Additionally, while some embodiments may have identical schema between database 1680 and local database 1675, alternate embodiments may have a first schema for database 1680 and a second schema for database 1675.

Figure 17:
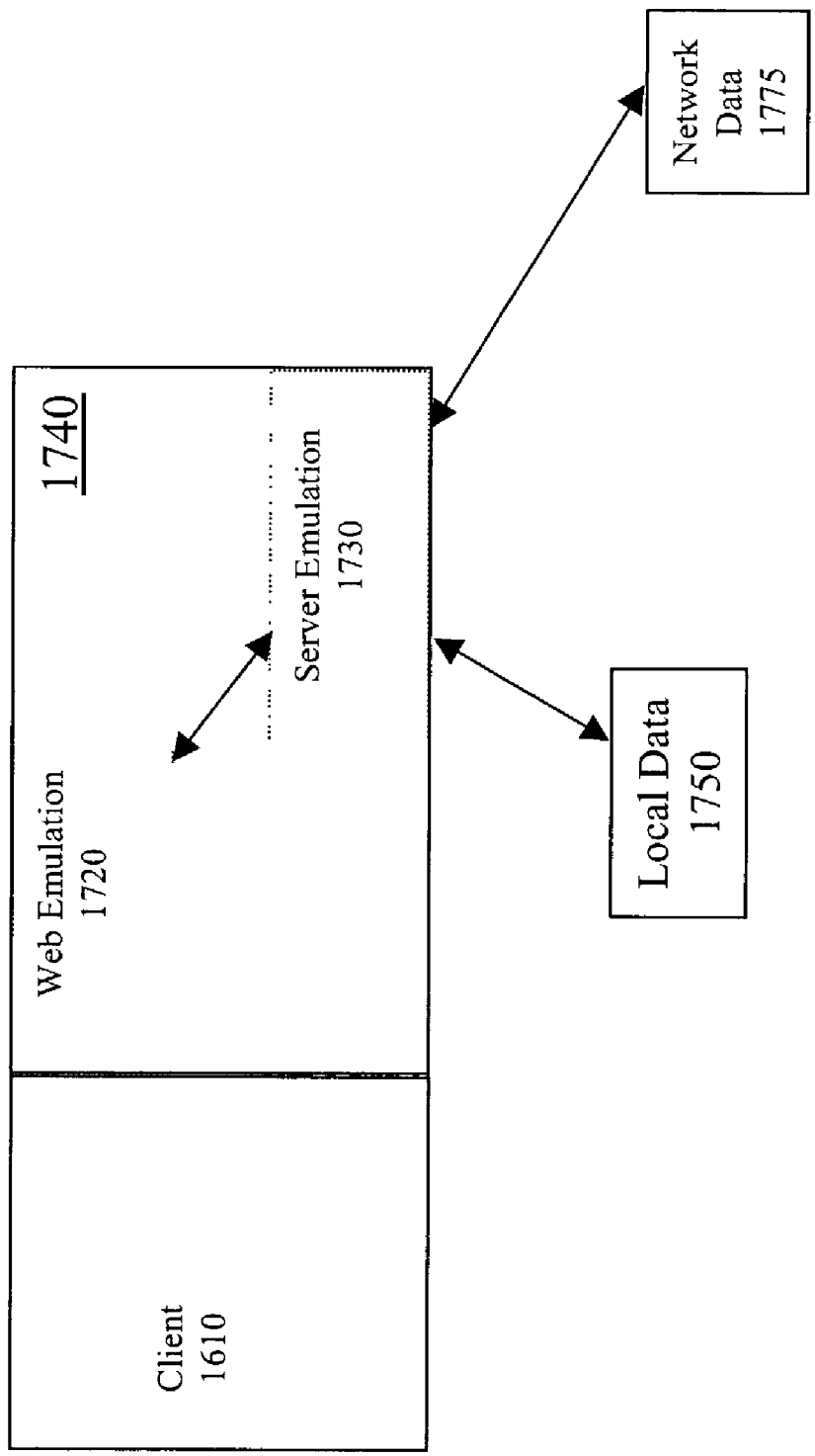
FIG. 17 illustrates another alternate embodiment of a web application.

FIG. 17 illustrates another alternate embodiment of a web application. Client 1710 and local web server 1740 both run on a first machine. Local web server 1740 includes a web emulation component 1720 which is suitable for emulating a remote web server from the point of view of the client 1710. Local web server 1740 also includes a server emulation component 1730 which is suitable for accessing data which may be utilized in handling a request from client 1710. Such data may be available from local data 1750 (such as a cache or local directory for example) on a standalone first machine. When the first machine is coupled to a second machine, network data 1775 may be available for access of data suitable for handling requests from client 1710.

As will be appreciated, client 1710 and local server 1740 may be portions of the same overall component in some embodiments, or may be separate or distinct components in alternate embodiments. Furthermore, server emulation component 1730 and web emulation component 1720 may be implemented as separate components without the need for an encompassing local server component 1740 in some embodiments. Preferably, the client 1710 is a web browser or similar interface for use by a user, with some customizations as appropriate for use in a particular web application. However, the client 1710 may be a component suitable for use with a variety of user interfaces such as web browsers to provide a web-based application.

Figure 18:
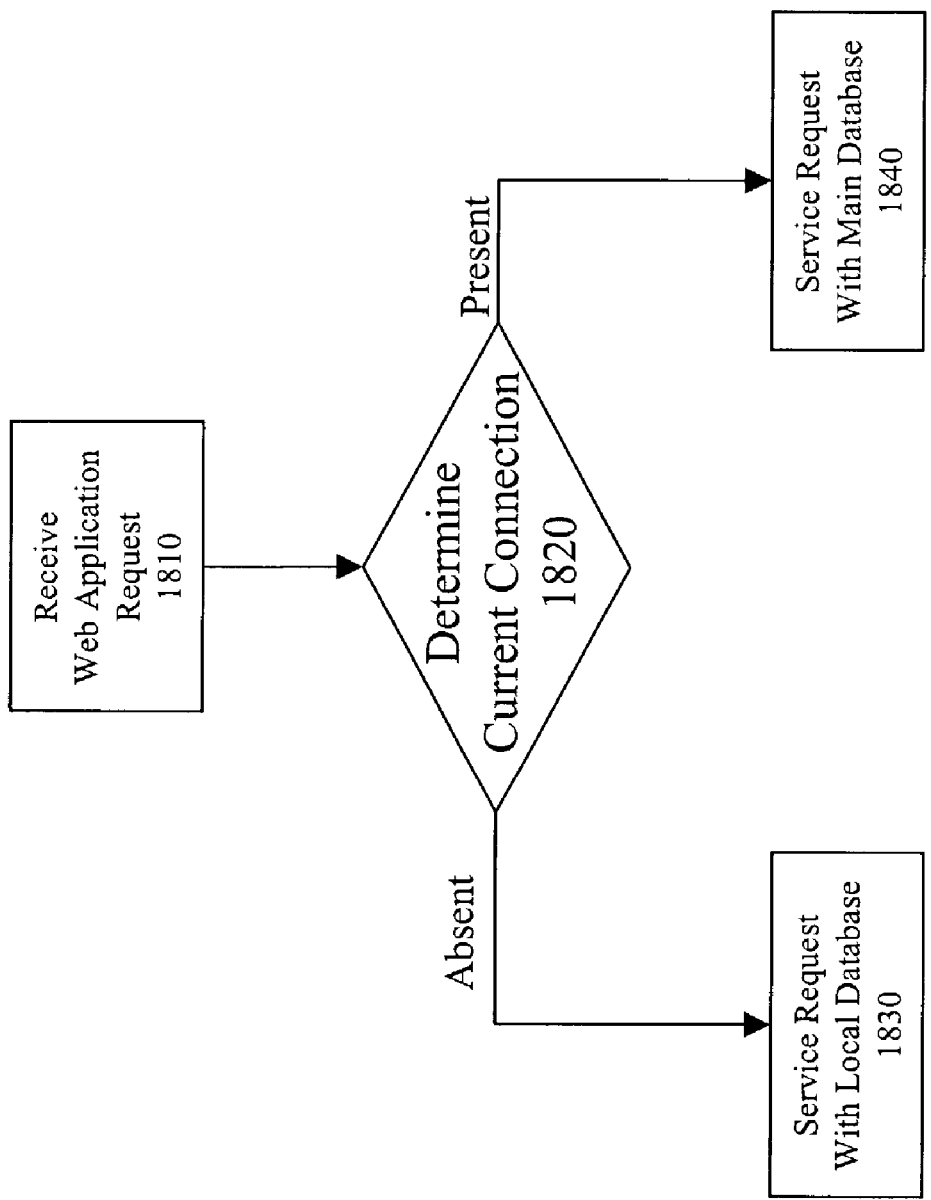
FIG. 18 illustrates an embodiment of a process of servicing requests in a web application for databases.

FIG. 18 illustrates an embodiment of a process of servicing requests in a web application for databases. At block 1810, a web application request is received, such as from a client. At block 1820, a determination is made as to whether a current connection between the servicing agent or component and a main database is present. If not, at block 1830, the request is serviced (or errors out) based on data present in a local SQL database accessible by the servicing agent. If the connection is present, the request is serviced (or errors out) at block 1840 based on data present in the main SQL database. Note that the main SQL database may be accessible by the servicing agent through a network connection or through some other interface, which may or may not have a connection of varying reliability. Furthermore, the servicing agent, in one embodiment, is a local web server component or process run on the same machine as a client from which a web application request originates.

Figure 19:
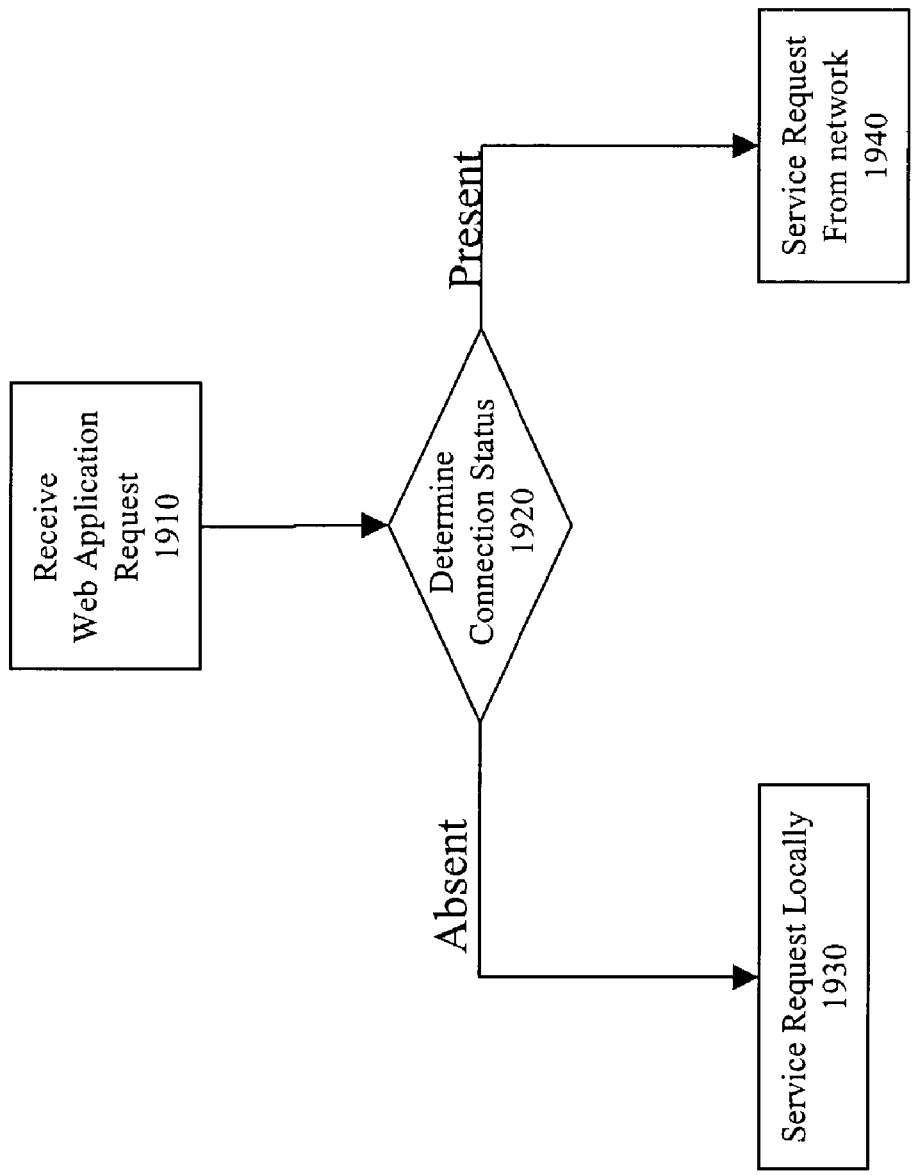
FIG. 19 illustrates an embodiment of a process of servicing requests in a web application.

FIG. 19 illustrates an embodiment of a process of servicing requests in a web application. At block 1910, a web application request is received, such as from a client. At block 1920, a determination is made as to whether a current connection between the servicing agent or component and a network is present. If the connection is present, at block 1940, the request is serviced (to the extent possible) based on data accessible via a network connection. If not, at block 1930, the request is serviced (to the extent possible) based on data present in a local cache or other source of data accessible by the servicing agent.

Note that the network connection or some other interface may or may not have a connection of varying reliability. Furthermore, it will be appreciated that the determination of presence or absence of a connection need not be made for every request, and that the determination may be made based on attempting a request via the network connection and then examining a result, lack thereof, or some form of timeout for example. Servicing requests of web applications may involve retrieval of data, may involve local processing of data already locally present, or may involve local or remote processing of remote data.

Figure 20:
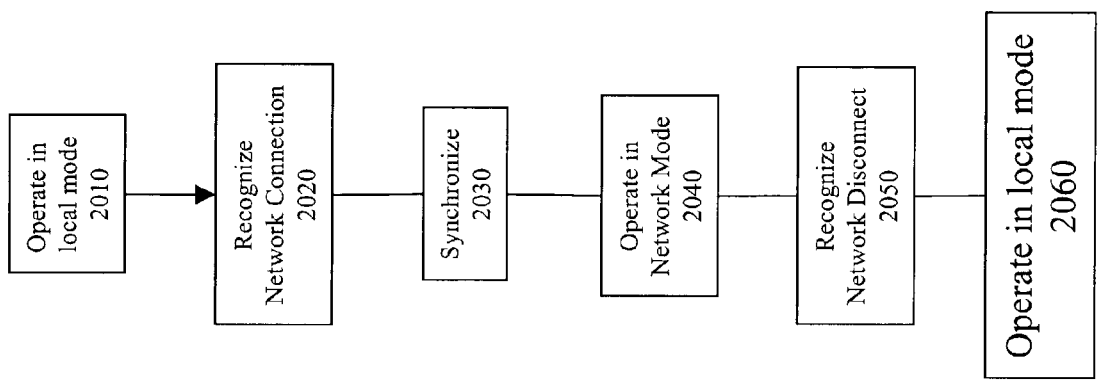
FIG. 20 illustrates an embodiment of a process of operating a web application for databases.

FIG. 20 illustrates an embodiment of a process of operating a web application for databases. At block 2010, the web application operates in local mode, servicing requests through a local web server utilizing a local database. At block 2020, a network connection to a main or primary database is recognized. At block 2030, synchronization between the local database and the main database occurs. At block 2040, the web application operates in network mode, servicing requests from data in the main database. At block 2050, recognition of lack of a network connection or a failure in the network connection occurs. At block 2060, the web application reverts to operation in local mode.

Note that disconnection with the network may be handled in a graceful way in some instances, such that synchronization occurs prior to the disconnection. Furthermore, note that synchronization need not occur at all. Alternatively, synchronization between the main database and local database may be accomplished as a background process while operating in network mode. Similarly, any changes in data in the main database during operation in network mode may be effected at essentially the same time in the local database, or on return of an indication that committing such changes to the main database was successful.

Figure 21:
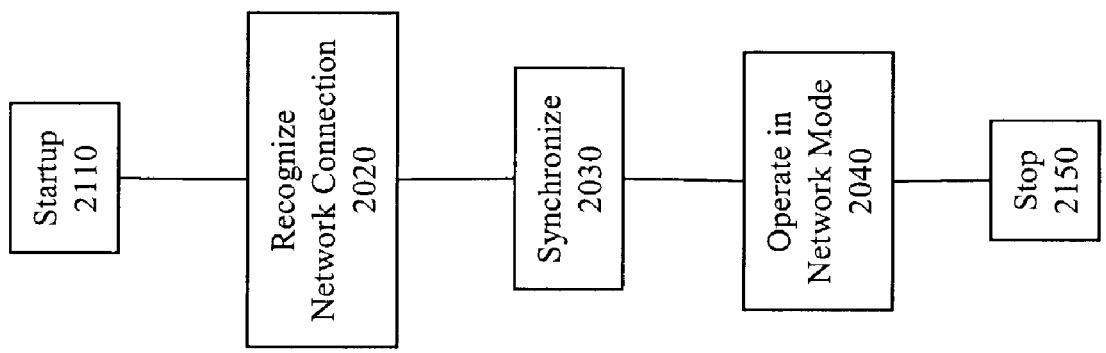
FIG. 21 illustrates an alternate embodiment of a process of operating a web application for databases.

FIG. 21 illustrates an alternate embodiment of a process of operating a web application for databases. At block 2110, the system starts up, initializing itself and determining its configuration or operating parameters. At block 2020, a network connection is recognized, indicating that communication with a network will be possible. At block 2030, synchronization between the local database and the main database occurs through the network connection. At block 2040, the web application operates in network mode, servicing requests from data in the main database. At block 2150, operation of the system stops.

Figure 22:
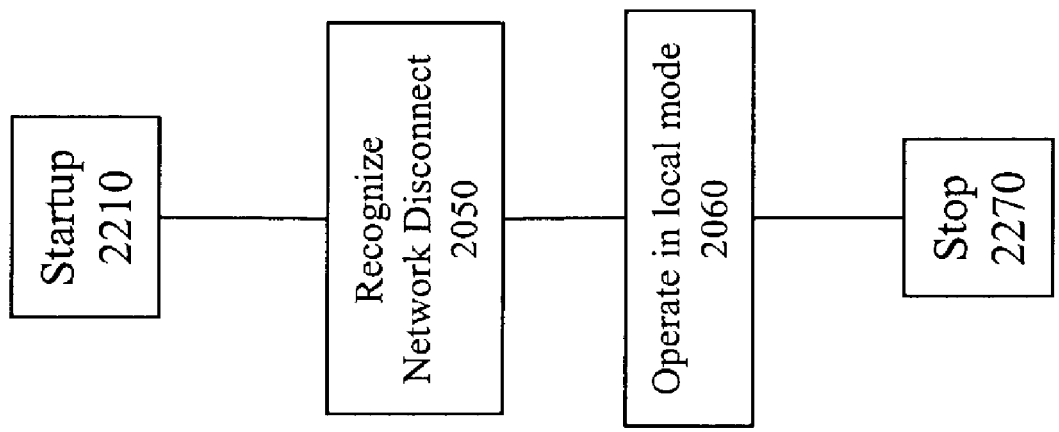
FIG. 22 illustrates another alternate embodiment of a process of operating a web application for databases.

FIG. 22 illustrates another alternate embodiment of a process of operating a web application for databases. At block 2210, the system starts up, initializing itself and determining its configuration or operating parameters. At block 2050, recognition of lack of a network connection or a failure in the network connection occurs. At block 2060, the web application operates in local mode, servicing requests through a local web server utilizing a local database. At block 2270, operation of the system stops.

Figure 23:
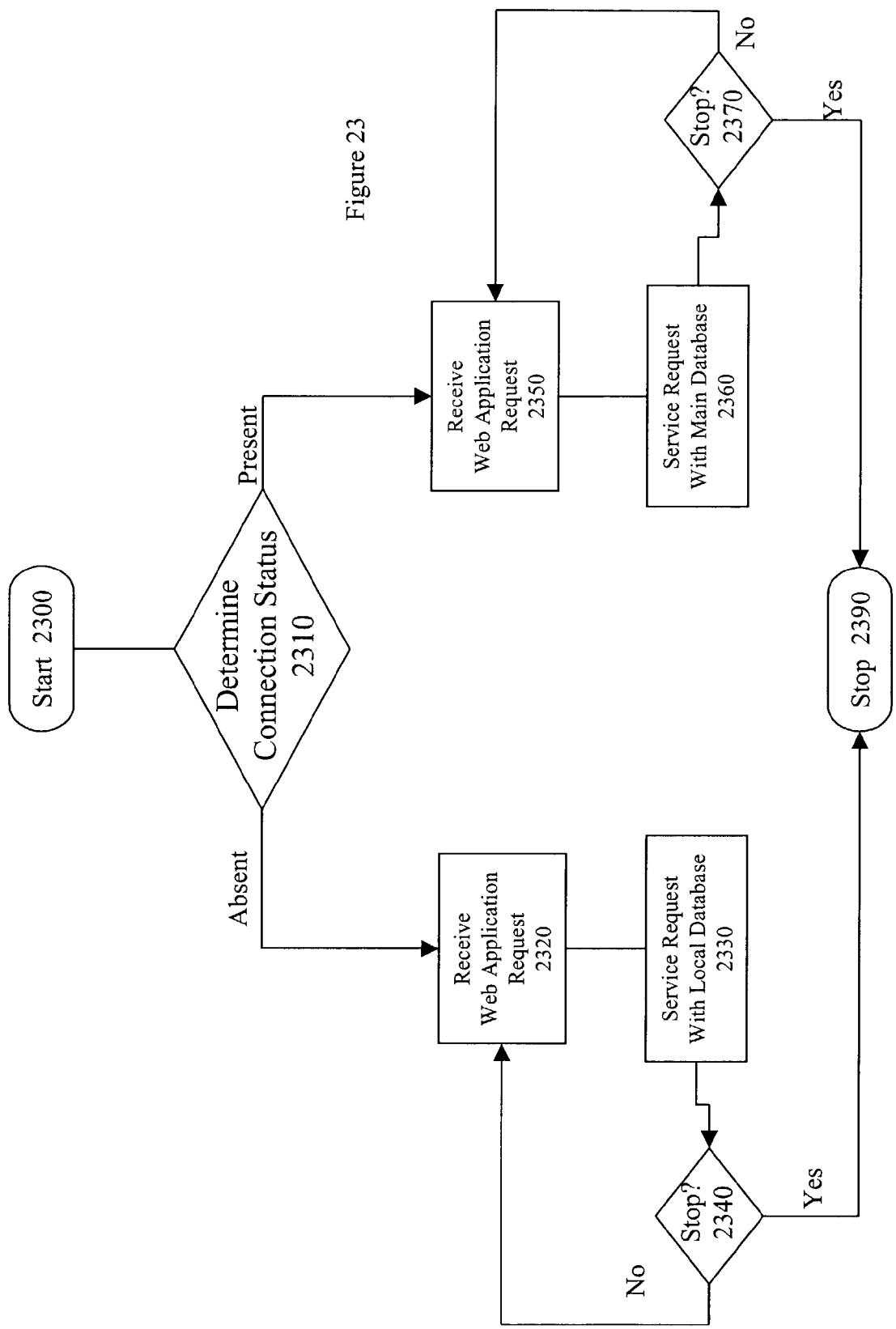
FIG. 23 illustrates an alternate embodiment of a process of servicing requests in a web application for databases.

FIG. 23 illustrates an alternate embodiment of a process of servicing requests in a web application for databases. At block 2300, the method begins with initialization and recognition of status. At block 2310, a determination is made as to current status of a network connection. If the network connection is absent, operation proceeds without the network at block 2320. At block 2320, a web application request is received. At block 2330, the request received at block 2320 is serviced through use of a local database or with local data. At block 2340, a determination is made as to whether operation should cease. If not, the process returns to block 2320 to await the next request. If operation should cease, at block 2390, operation stops.

If a network connection is present, the process proceeds from block 2310 to block 2350. At block 2350, a web application request is received. At block 2360, the request is serviced using data from a main database or through other data available through the network connection. At block 2370, a determination is made as to whether operation should cease. If not, the process returns to block 2350 and awaits another request. If operation should cease, the process proceeds to block 2390 and stops.

Figure 24:
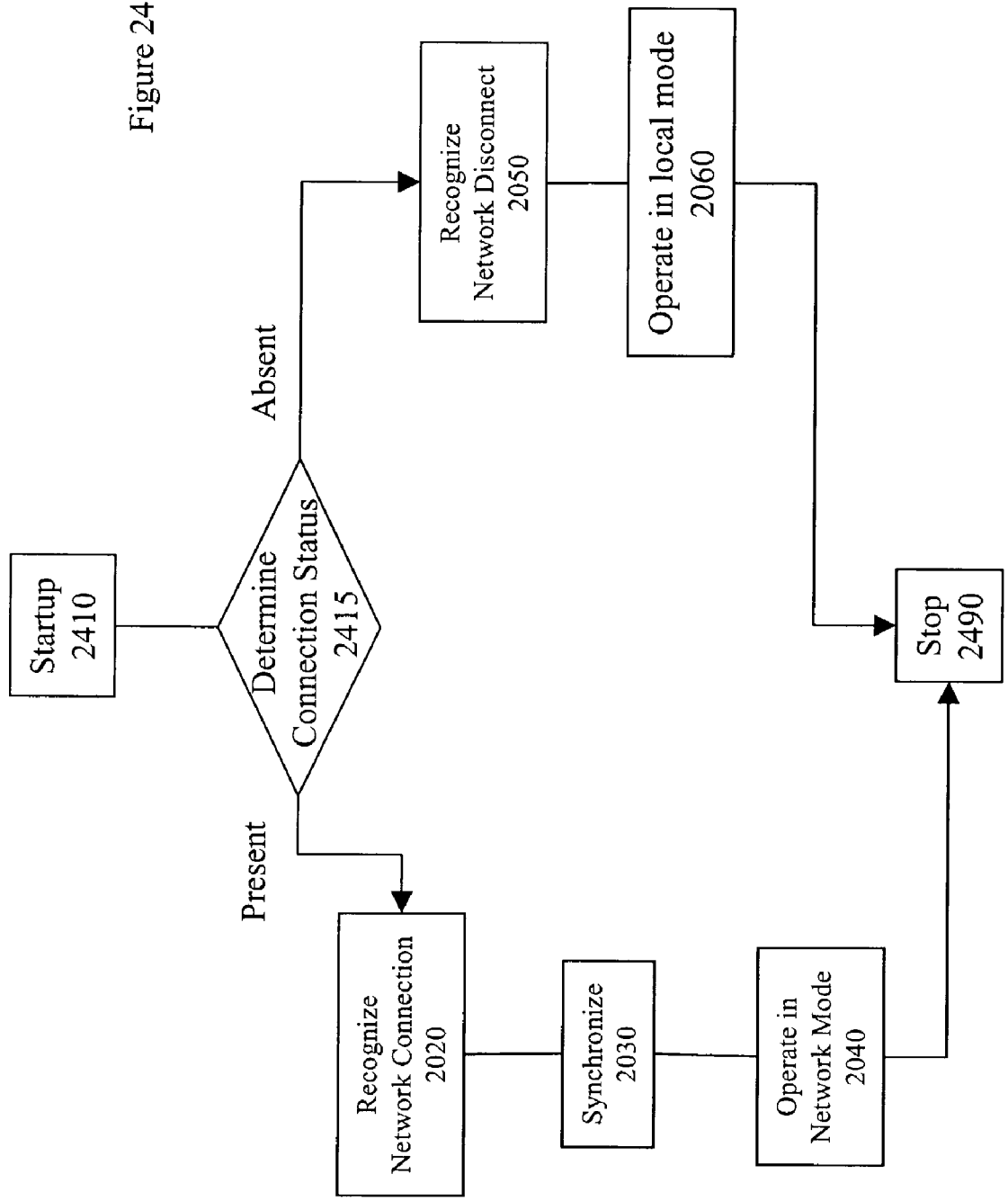
FIG. 24 illustrates an alternate embodiment of a process of servicing requests in a web application.

FIG. 24 illustrates an alternate embodiment of a process of servicing requests in a web application. At block 2410, the method begins with initialization and recognition of status. At block 2415, a determination is made as to current status of a network connection. If the connection is present (or operational), at block 2020, a network connection to a main or primary database is recognized. At block 2030, synchronization between the local database and the main database occurs. At block 2040, the web application operates in network mode, servicing requests from data in the main database through the network connection. When operation is completed, at block 2490, the process stops.

If the network connection is not present, or not operational, the process proceeds to block 2050. At block 2050, recognition of lack of a network connection or a failure in the network connection occurs. At block 2060, the web application operates in local mode, servicing requests through a local web server utilizing a local database. Finally, when operation is completed, at block 2490, the process stops.

Some portions of the previous detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description. In addition, the present invention is not described with reference to any particular programming language. It will be appreciated that a variety of programming languages may be used to implement the teachings of the invention as described herein.

It should be emphasized that functional components, as shown above in the figures and described in the text accompanying the figures, could be implemented using software code segments. If the aforementioned functional components are implemented using software code segments, it should be further emphasized that these code segments can be stored on a machine-readable medium, such as floppy disk, hard drive, CD-ROM, DVD, tape, memory, or any storage device that is accessible by a computing machine.

A method, system and apparatus for a mobile web client is presented. In one embodiment, the invention is a method of operating a web application. The method includes receiving a request from a client. The method further includes processing the request with a web emulator. The method also includes servicing the request from available data.

In some embodiments, the method may further include using a plug-in for a web server as the web emulator, the plug-in passing the request to a web engine, and the web engine servicing the request in conjunction with a data manager. In some embodiments, the method may further include the data manager attempting access to available data over a network. Additionally, the method may include the data manager utilizing available data from the network upon successful access and utilizing available data from local data upon failed access to service the request. Furthermore, the method may involve the request including sending data from the client to the network and the request including receiving data from the network.

In an alternate embodiment, the invention is a method of operating a web application for use in conjunction with a database. The method includes receiving a request from a client, processing the request with a web emulator, and servicing the request from available data in a database.

In alternate embodiments the available data is available over a network in a main database or is available locally in a local database, without access to a network. Similarly, in alternate embodiments, the method may further include attempting access to available data in a main database over a network. The method may also further include: upon successful access over the network, servicing the request utilizes available data from the main database through the network. Similarly, the method may also further include: upon failed access over the network, servicing the request utilizes available data from local data in a local database.

In the foregoing detailed description, the method and apparatus of the present invention has been described with reference to specific exemplary embodiments thereof. It will, however, be evident that various modifications and changes may be made thereto without departing from the broader spirit and scope of the present invention. In particular, the separate blocks of the various block diagrams represent functional blocks of methods or apparatuses and are not necessarily indicative of physical or logical separations or of an order of operation inherent in the spirit and scope of the present invention. For example, the various blocks of FIG. 17 may be integrated into components, or may be subdivided into components. Similarly, the blocks of FIG. 18 (for example) represent portions of a method which, in some embodiments, may be reordered or may be organized in parallel rather than in a linear or step-wise fashion. The present specification and figures are accordingly to be regarded as illustrative rather than restrictive.

What is claimed is:

1. A method of operating a web application comprising:
   receiving a request from a client web browser;
   processing the request with a web emulator, wherein the request can be satisfied by accessing one of an external database and a local database;
   monitoring a current status of a network connection to the external database;
   if said monitoring provides that the network connection to the external database is present, operating in a network mode wherein the operating in the network mode comprises servicing the processed request from data in the external database without accessing the local database, and switching the operating from the network mode to a local mode if the monitoring provides that the current status indicates the network connection is not present; and
   if said monitoring provides that the network connection to the external database is not present, operating in the local mode wherein the operating in the local mode comprises servicing the processed request from data in the local database without accessing the external database.

2. The method of claim 1 further comprising:
   servicing the processed request from the data in the local database if data for the request is available locally, without access to the network.

3. The method of claim 1 further comprising: attempting access to the external database over the network.

4. The method of claim 1 wherein:
   the web emulator is a plug-in for a web server, the plug-in passing the request to a web engine, the web engine servicing the request in conjunction with a data manager.

5. The method of claim 4 wherein the data manager is to attempt to access the external database over the network, to utilize the data from the external database upon successful access, and to utilize the data from the local database upon failed access to service the request.

6. The method of claim 1 wherein the request includes sending data from the client to the network.

7. The method of claim 1 wherein the request includes receiving data from the network.

8. The method of claim 1 wherein the request includes sending and receiving data.

9. An apparatus for operating a web application comprising:
   means for receiving a request from a client web browser;
   means for processing the request where the request can be satisfied by accessing one of an external database and a local database;
   means for determining monitoring a current status of a network connection to the external database;
   means for operating in a network mode servicing the processed request from data in the external database without accessing the local database if the means for determining monitoring provides that the network connection to the external database is present~ wherein the means for operating in the network mode comprises means for servicing the processed request from data in the external database without accessing the local database; and means for operating in a local mode servicing the processed request from data in a local database without accessing the external database if the means for determining monitoring provides that the network connection to the external database is not present~ wherein the means for operating in the local mode comprises means for servicing the processed request from data in a local database without accessing the external database.

10. A non-transitory machine-readable medium embodying instructions, which, when executed by a processor, cause the processor to perform a method, the method comprising:

receiving a request from a client web browser;

processing the request with a web emulator, wherein the request can be satisfied by accessing one of an external database and a local database;

monitoring a current status of a network connection to the external database;

if said monitoring provides that the network connection to the external database is present, operating in a network mode wherein the operating in the network mode comprises servicing the processed request from data in the external database without accessing the local database and switching the operating from the network mode to a local mode if the monitoring provides that the current status indicates the network connection is not present; and if said determining provides that the network connection to the external database is not present, operating in the local mode wherein the operating in the local mode comprises servicing the processed request from data in the local database without accessing the external database.

11. The non-transitory machine-readable medium of claim 10 further embodying instructions, which, when executed by the processor, cause the processor to perform the method which further comprises:

attempting access to the external database over the network.

12. A system comprising:

a web emulator to receive a request from a client web browser and to redirect the request to an object manager; and the object manager configured to monitor a current status of a network connection to an external database, operate in a network mode service the request from data in the external database without access to a local database if said current status provides that the network connection to the external database is present, wherein in the network mode, the object manager is further configured to service the request from data in the external database without access to a local database, and switch the operating from the network mode to a local mode if the current status indicates the network connection is not present, and operate in the local mode service the request from data in the local database without access to the external database if said determining provides that the network connection to the external database is not present, wherein in the local mode, the object manager is further configured to service the request from data in the local database without access to the external database.

13. The system of claim 12 wherein: the web emulator is a plug-in for a web server; and the object manager comprises a web engine and a data manager.

14. The system of claim 13 wherein:

the web engine is to receive the request from the plug-in and to pass the request to the data manager; and the data manager is to determine whether the network connection to the external database is present.

15. The method of claim 1 wherein: the operating in a network mode further comprises synchronizing the local database with the external database.

16. The method of claim 15 wherein:

the synchronizing the local database with the external database comprises propagating changes made in the local database to the external database.

17. The method of claim 1, wherein:

the web emulator and the client web browser execute on a first machine.

* * * * *

UNITED STATES PATENT AND TRADEMARK OFFICE
CERTIFICATE OF CORRECTION

PATENT NO.       : 7,962,565 B2
APPLICATION NO.  : 10/254384
DATED            : June 14, 2011
INVENTOR(S)      : Coker It is certified that error appears in the above-identified patent and that said Letters Patent is hereby corrected as shown below:

In column 7, line 27, delete "(OM)layer" and insert -- (OM) layer --, therefor.

In column 7, line 44, delete "(e.g.SQL" and insert -- (e.g. SQL --, therefor.

In column 12, line 6, delete "Oust" and insert -- (just --, therefor.

In column 15, line 57-58, delete "CSSSWEView" and insert -- CSSWEView --, therefor.

In column 16, line 1-2, delete "notifications" and insert -- notifications. --, therefor.

In column 16, line 16, delete "conditions" and insert -- conditions. --, therefor.

In column 16, line 56, delete "NotifyNewSellds" and insert -- NotifyNewSelIds --, therefor.

In column 16, line 58, delete "UI" and insert -- UI --, therefor.

In column 16, line 60, delete "UI" and insert -- UI --, therefor.

In column 24, line 19, in Claim 1, delete "mode" and insert -- mode, --, therefor.

In column 24, line 28, in Claim 1, delete "mode" and insert -- mode, --, therefor.

In column 24, line 61, in Claim 9, delete "for determining" and insert -- for --, therefor.

In column 24, line 63-65, In Claim 9, after "mode" delete "servicing the processed request from data in the external database without accessing the local database".

In column 24, line 65-66, In Claim 9, after "for" delete "determining".

Signed and Sealed this
Twenty-fifth Day of October, 2011

David J. Kappos
*Director of the United States Patent and Trademark Office*

CERTIFICATE OF CORRECTION (continued)
U.S. Pat. No. 7,962,565 B2

In column 24, line 67, in Claim 9, delete "present~" and insert -- present, --, therefor.

In column 25, line 4-6, in Claim 9, after "mode" delete "servicing the processed request from data in the external database without accessing the local database".

In column 25, line 6-7, in Claim 9, after "for" delete "determining".

In column 25, line 8, in Claim 9, delete "present~" and insert -- present, --, therefor.

In column 25, line 23, in Claim 10, delete "mode" and insert -- mode, --, therefor.

In column 25, line 25, in Claim 10, delete "database" and insert -- database, --, therefor.

In column 25, line 30, in Claim 10, delete "determining" and insert -- monitoring --, therefor.

In column 25, line 32, in Claim 10, delete "mode" and insert -- mode, --, therefor.

In column 26, line 7-8, in Claim 12, after "mode" delete "service the request from data in the external database without access to a local database".

In column 26, line 17-19, in Claim 12, after "mode" delete "service the request from data in the external database without access to a local database".

In column 26, line 19, in Claim 12, delete "determining" and insert -- monitoring --, therefor.

In column 26, line 24-26, Delete "13. The system of claim 12 wherein: the web emulator is a plug-in for a web server; and the object manager comprises a web engine and a data manager." and insert -- The system of claim 12 wherein:
the web emulator is a plug-in for a web server; and
the object manager comprises a web engine and a data manager. --, therefor.